Oct. 13, 1964 A. H. FAULKNER ETAL 3,153,122

ELECTRONIC SWITCHING SYSTEM

Filed Sept. 5, 1961 10 Sheets-Sheet 1

INVENTORS.
ALFRED H. FAULKNER
DONALD K. MELVIN
BY C. A. Gulbrandsen
ATTY.

ELECTRONIC SWITCHING SYSTEM

ELECTRONIC SWITCHING SYSTEM

Filed Sept. 5, 1961 10 Sheets-Sheet 4

Oct. 13, 1964 A. H. FAULKNER ETAL 3,153,122

ELECTRONIC SWITCHING SYSTEM

Filed Sept. 5, 1961 10 Sheets-Sheet 6

Oct. 13, 1964 A. H. FAULKNER ETAL 3,153,122

ELECTRONIC SWITCHING SYSTEM

Filed Sept. 5, 1961 10 Sheets-Sheet 10

United States Patent Office 3,153,122

Patented Oct. 13, 1964

3,153,122

ELECTRONIC SWITCHING SYSTEM

Alfred H. Faulkner, Redondo Beach, and Donald K. Melvin, San Carlos, Calif., assignors to Automatic Electric Laboratories, Inc., Northlake, Ill., a corporation of Delaware Filed Sept. 5, 1961, Ser. No. 135,823

17 Claims. (Cl. 179—26)

Figure 1:
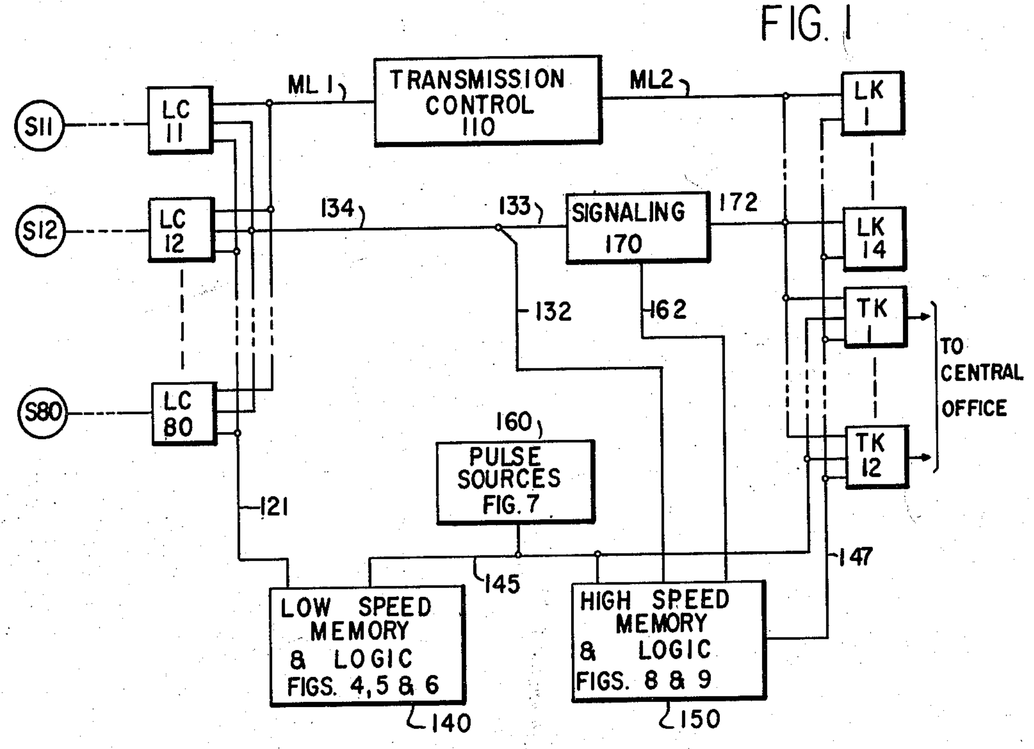

This invention relates to an electronic switching system, and more particularly to a communication switching system used as a private automatic branch exchange with time division multiplex principles used for switching control.

It is a principal object of this invention to provide a simple and effective arrangement for transferring calls, taking full advantage of the time shared switching control circuits.

According to the invention, the foregoing object is achieved in a communication switching system having common control equipment shared on a time division multiplex basis by a plurality of connections, with a recirculating memory and logic circuits for modifying the information stored in the memory in response to signals such as hookswitch and dialing, by providing a transfer arrangement which is seized under control of one of the lines engaged in a connection and in response to a signal such as a special digit from that line establishes a new connection.

The memory may comprise a coordinate array of elements such as ferrite cores, in which each column is coupled to a bistable device such as a flip flop, and the rows are connected to the output of a pulse distributor so that each is driven in a separate time slot to read out the cores into the bistable device, which is then rewritten in the same form or as selectively modified by the logic circuits.

A group of transfer storage elements, such as an additional row of cores in the memory, is used to transfer information such as line numbers from one memory row to another to aid in transferring a connection.

The invention in a particular form may be embodied in the Electronic Switching System disclosed in our U.S. patent application Serial No. 843,380 filed September 30, 1959, now Patent No. 3,015,699 issued January 2, 1962. In that system the switching control circuits are time shared on a time division multiplex basis, using two recirculating memories, one operating at low speed and the other at high speed. The connections are established by time division multiplex transmission over a common medium connected between line circuit transmission gates and connecting unit transmission gates. The multiplex transmission pulse cycles correspond to the high-speed memory pulse cycles, and the multiplex sampling for each connection occurs during the time slot assigned to the connecting unit. Thus there is provided a combination in which time division multiplex is used both for voice transmission and for time sharing of the control equipment which controls the selection and establishment of connections over the multiplex transmission medium. Links, each of which comprises a finder and a connector, are used to establish local calls between line circuits. Each link is permanently assigned two time slots in the multiplex transmission cycle, one for the line finder and the other for the connector. The high-speed memory is a coordinate array of elements such as ferrite cores. Each finder and each connector has an individual row in the high-speed memory in which the line number of the line circuit to which the finder or connector is selectively connected is stored. To provide a private automatic branch exchange with trunking to a central office, trunk circuits may be added each having one transmission gate with a permanently assigned time slot and a corresponding individual row of cores in the high speed memory.

To provide transfer features, a row of elements capable of storing a line number is added to the high-speed memory. This row does not have a time slot assigned thereto. This row is used to transfer a line number from one connecting unit or trunk circuit to another. In the time slot of the first unit a number is read out of the row of that unit and into the transfer row, and in the time slot of the second unit the number is read out of the transfer row and into the row of that unit. A transfer sequence circuit is provided to control the individual steps involved in effecting a transfer. Each link and each trunk has a transfer marking core in the low speed memory to indicate that it has seized or been seized by the transfer control.

In a specific arrangement for making a transfer in which a trunk is connected to one line circuit and is to be connected to another line circuit, a special digit is first dialed by the first line circuit. This number is registered by the call sequence switch and causes seizure of the transfer circuit. This in turn causes the line number of the line circuit to be registered in the transfer row, and another link to be seized and the line number written into the finder row of that link. The line number of the desired line may then be dialed and registered in the connector row of that link. In response to disconnect by either of the two line circuits, the other line circuit is connected to the trunk. If the finder-connector line circuit disconnects, the line number from the connector row is read into the transfer row, the trunk row is cleared, and the number from the transfer row is then read into the trunk row. If on the other hand the connector-connected line circuit disconnects, the link is released and the original connection between the first line circuit and the trunk is restored to normal conversation.

According to a further feature of the invention, the transfer row is also used to connect a calling line circuit to a trunk for an outgoing call. Upon initiating a call, the calling line circuit is connected to a line finder with his number registered in the corresponding high speed memory row, in the same manner as for a local call. Then upon dialing a special digit, the transfer circuit is seized and the line number is transferred from the finder row to the transfer row, and then to the row of an idle trunk circuit.

A further feature relates to the provision of an auxiliary link for initiating outgoing calls if all regular links are busy, with provision for blocking the use of the auxiliary link to complete a local call.

Another object of the invention is to provide an allotter arrangement which insures that an outgoing call may be inititaed even if an all links busy condition exists for local calls.

One of the features of our said prior application is an allotter which includes a trigger which is time shared by a plurality of electronic line finders and which serves to indicate whether or not each of these line finders is in scanning condition. There is also provided an allotter trigger common to all line finders, this trigger controlling and being controlled by the scanning-indicating trigger for conditioning only one idle line finder for scanning at a time. After this finder has linked up with the calling line the allotter trigger acts to automatically allot the next idle finder in order.

According to a feature of the present invention, one of the line finders is an auxiliary finder arranged so that it can only be used to initiate outgoing calls, and two allotter trigger devices common to all of the line finders are provided, with an arrangement such that the auxiliary line finder is conditioned for scanning only if all regular line finders are busy.

Figure 12:
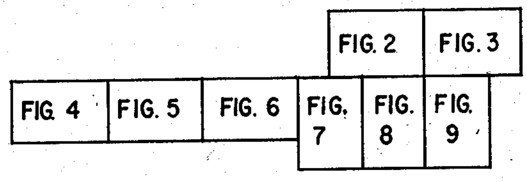
Figure 8:
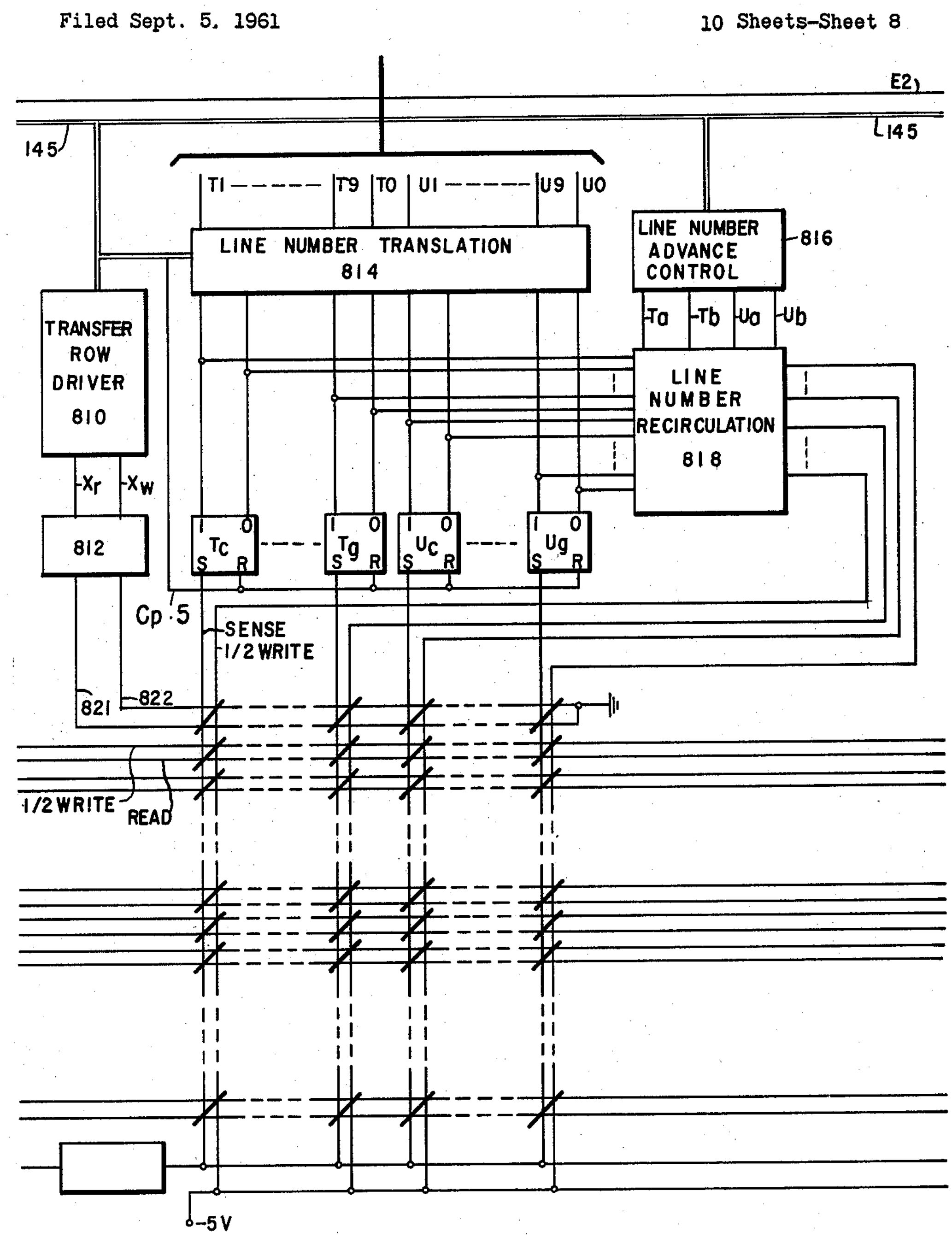
Figure 9:
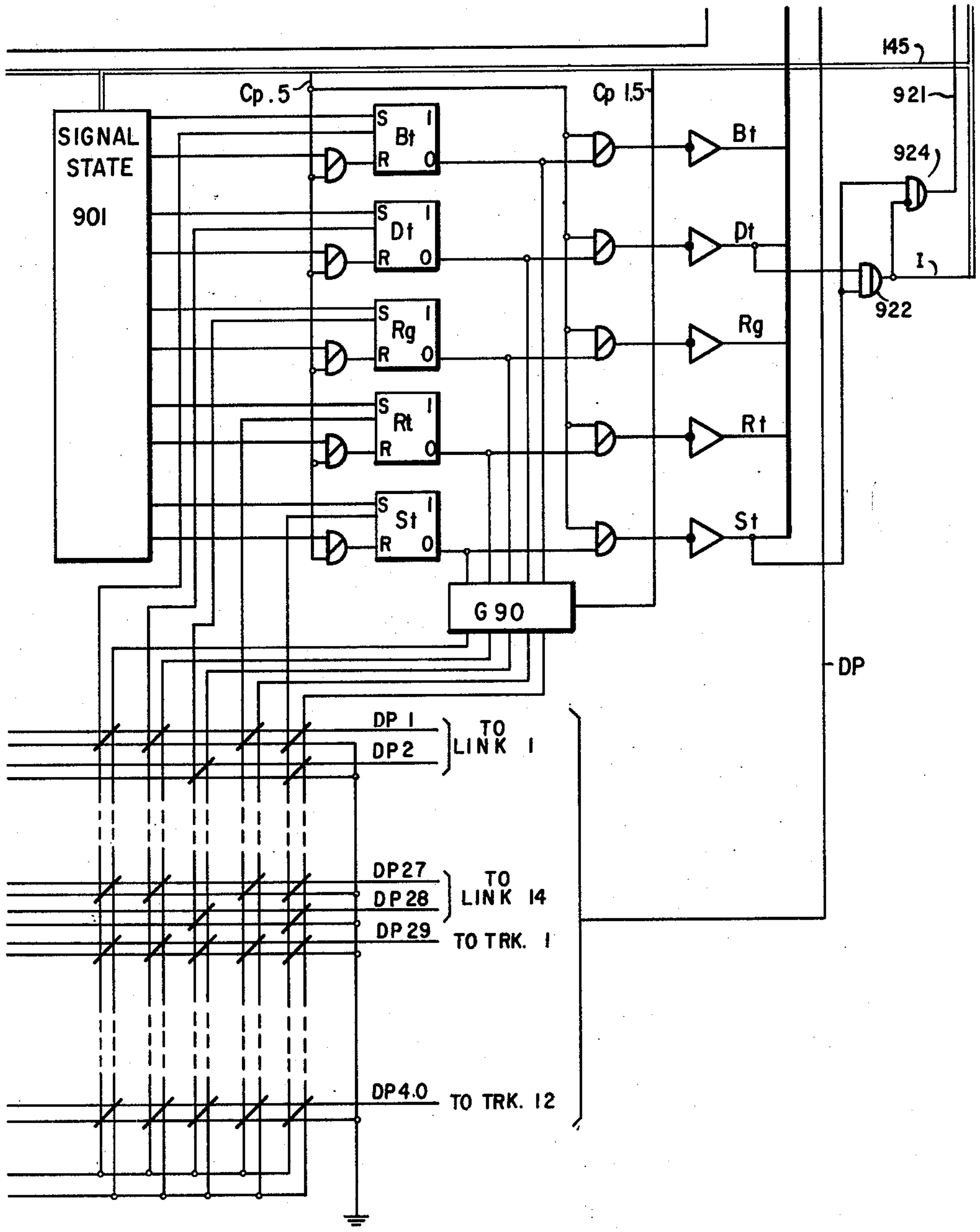
Figure 10:
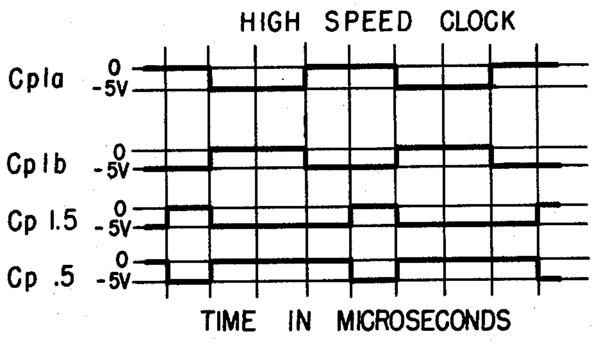
Figure 11:
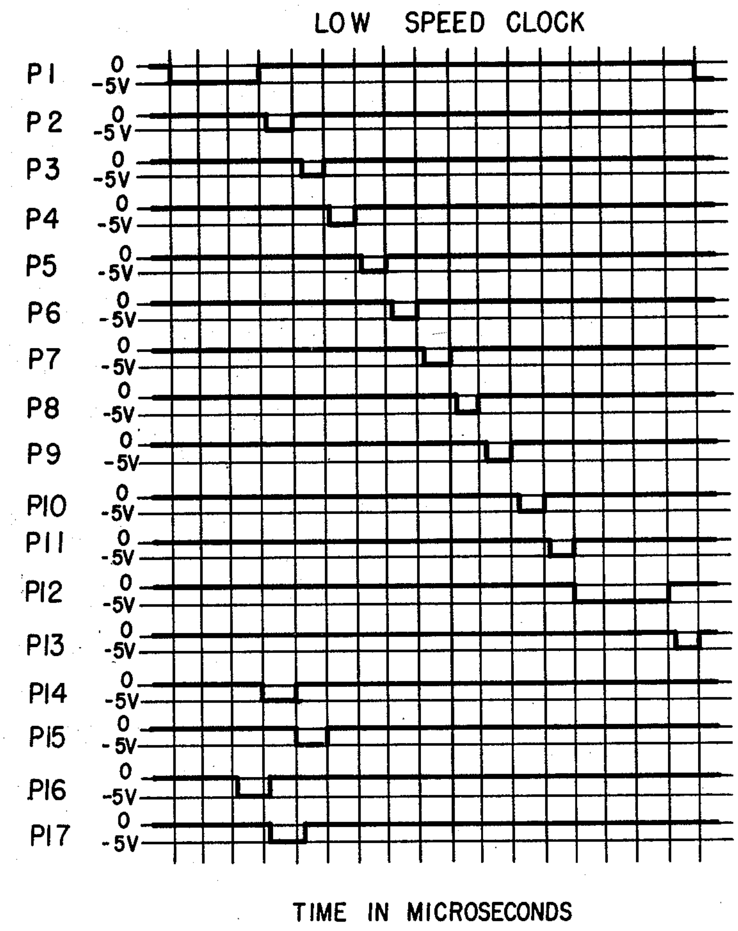

The above-mentioned and other objects and features of this invention and the manner of obtaining them will become more apparent and the invention itself will be best understood by reference to the following description of an embodiment of the invention taken in conjunction with the accompanying drawings comprising FIGURES 1–12, wherein:

FIG. 1 is a single line block diagram of the entire system;

FIGS. 2 to 9, when arranged together as shown in FIG. 12, comprise a diagram showing the innerconnections of the various units in block and schematic form;

FIGS. 10 and 11 are graphs showing the timing of the pulses for use in the time division multiplex operation; and FIG. 12 shows how FIGS. 2 to 9 are to be arranged together.

The invention is disclosed herein as embodied in an electronic private automatic branch exchange, described in accordance with the following outline:

OUTLINE OF DESCRIPTION

A. General Description
B. Functional Diagram (FIGS. 2–9)
C. Pulse Sources and Definitions (FIG. 6)
D. Time Division Distribution Plan
  D1. High-Speed Circuits
  D2. Low Speed Circuits
  D3. Time Relation betwen Low Speed and High Speed Circuits
E. Transmission Circuits (FIGS. 2 and 3)
  E1. Line Circuits
  E2. Link Circuits
  E3. Trunk Circuits
  E4. Signalling
F. Low Speed Logic and Memory (FIGS. 4, 5 and 6)
  F1. Allotter and Busy Logic
  F2. Timer (FIG. 4)
  F3. Call Sequence Switch
  F4. Dialing Supervision
  F5. Identification of Link and Trunk Logic Cycles
  F6. Trunk and Transfer
  F7. Line and Trunk Supervision
G. High Speed Logic and Memory (FIGS. 8 and 9)
  G1. Line Number Register (FIG. 8)
  G2. Transfer Row
  G3. Signal State Register
H. Combined Equations
  H1. Trunk Circuit (350)
  H2. Allotter and Busy (401)
  H3. Timer Reset (402)
  H4. Timer (403)
  H5. Sequence Advance and Reset (501)
  H6. Call Sequence (502)
  H7. Dialing Supervision (504)
  H8. Trunk and Transfer (601)
  H9. Transfer Sequence Circuit (602)
  H10. Line and Trunk Supervision (603)
  H11. Transfer Row Driver (810)
  H12. Line Number Advance (816)
  H13. Signal State Register (901)
J. Operation
  J1. Link—Finder Operation
  J2. Link—Connector Operation
    J2*a*. Called Line Busy
    J2*b*. Called Line Idle
  J3. Trunk—Incoming Call Operation
  J4. Trunk Transfer—Incoming Call
    J4*a*. Calling Party Disconnect—Called Party Transferred to Trunk
    J4*b*. Called Party Disconnect—Calling Party Transferred to Trunk
    J4*c*. Called Line Busy or No Answer
  J5. Outgoing Call
  J6. Disconnect

A. GENERAL DESCRIPTION

The following references relate to the said electronic switching system in the form of a private automatic exchange (PAX), or to arrangements used therein.

(1) A. H. Faulkner, D. K. Melvin, United States patent application, Serial No. 843,380, filed September 30, 1959, now Patent No. 3,015,699 issued January 2, 1962.

(2) A. H. Faulkner, D. K. Melvin, United States patent application, Serial No. 843,381, filed September 30, 1959, now Patent No. 3,070,665 issued December 25, 1962.

(3) D. K. Melvin, United States patent application, Serial No. 845,191, filed October 8, 1959, now Patent No. 3,033,935 issued May 8, 1962.

(4) P. E. Osborn, United States patent application, Serial No. 845,736, filed October 10, 1959, now Patent No. 3,046,348 issued July 24, 1962.

(5) A. H. Faulkner, United States patent 2,987,577.

(6) P. E. Osborn, A Ferrite-Core Memory System and Distributor for a Small Electronic Telephone Switching System, General Telephone Technical Journal, Vol. 6, No. 6, October 1959, pp. 220–226.

The system in the form of a private automatic branch exchange (PABX) with trunk circuits to a central office is shown by a single line block diagram in FIG. 1. Line circuits LC11 to LC80 associated with stations S11 to S80 are connected in common to the end ML1 of a time division multiplex transmission highway. Link circuits LK1 to LK14 and trunk circuits TK1 to TK12 are connected in common to the other end ML2 of the transmission highway. A transmission control unit 110 may be interposed between the two ends of the multiplex transmission highway. Any two line circuits may be connected through any link circuit, or any line circuit may be connected to any trunk circuit by selectively supplying control pulses to them.

The signalling circuits 170 supply supervisory tones and ringing control signals which are transmitted either by time division multiplex over line 172 and the highway ML1–ML2, or over conductors in line 133–134.

The function of remembering which circuits are interconnected on a time division multiplex basis over highway ML1–ML2 and of supplying control pulses to the selected transmission gates in the appropriate time slots is performed by a high-speed memory and logic 150. The control pulses are supplied to the line circuits over line 132–134, to the line and trunk circuits over line 137, and to the signalling circuits over line 162.

The selective registration in the high-speed memory is controlled by the low-speed memory and logic 140. These circuits 140 control the line-finding function of scanning to find a line which has initiated a call and causing a connection to be established to the calling line; and the connector function of detecting dial pulses from the calling line and causing a connection to be established to the called line, and also trunk and transfer functions. These control circuits 140 are shared by all of the links and trunks on a time division basis, using a low-speed ferrite core memory for storage.

The pulse sources 160 comprise pulse generators and distributors for supplying all of the pulses required by the exchange.

B. FUNCTIONAL DIAGRAM (FIGS. 2–9)

Figure 2:
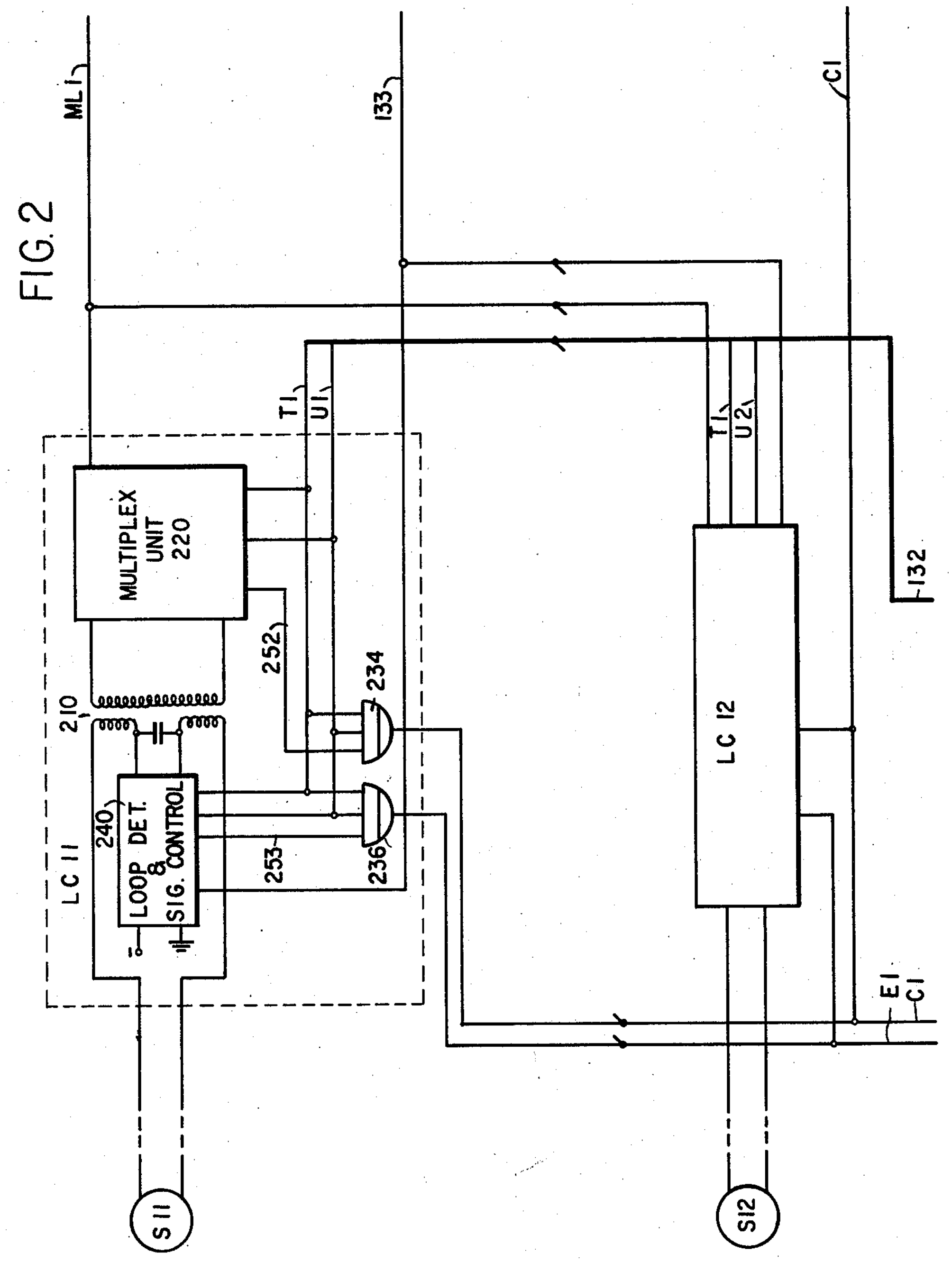
Figure 3:
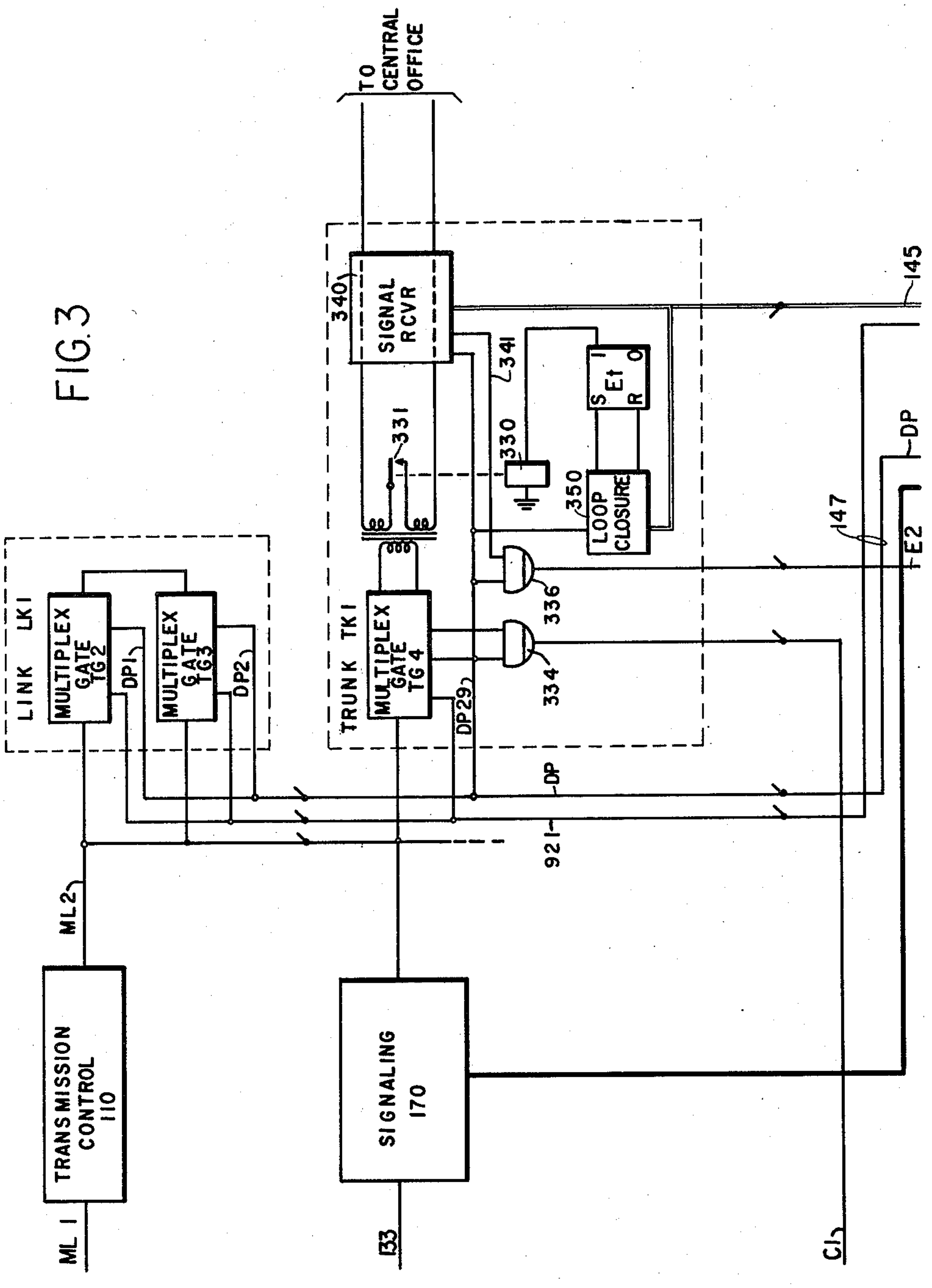
Figure 4:
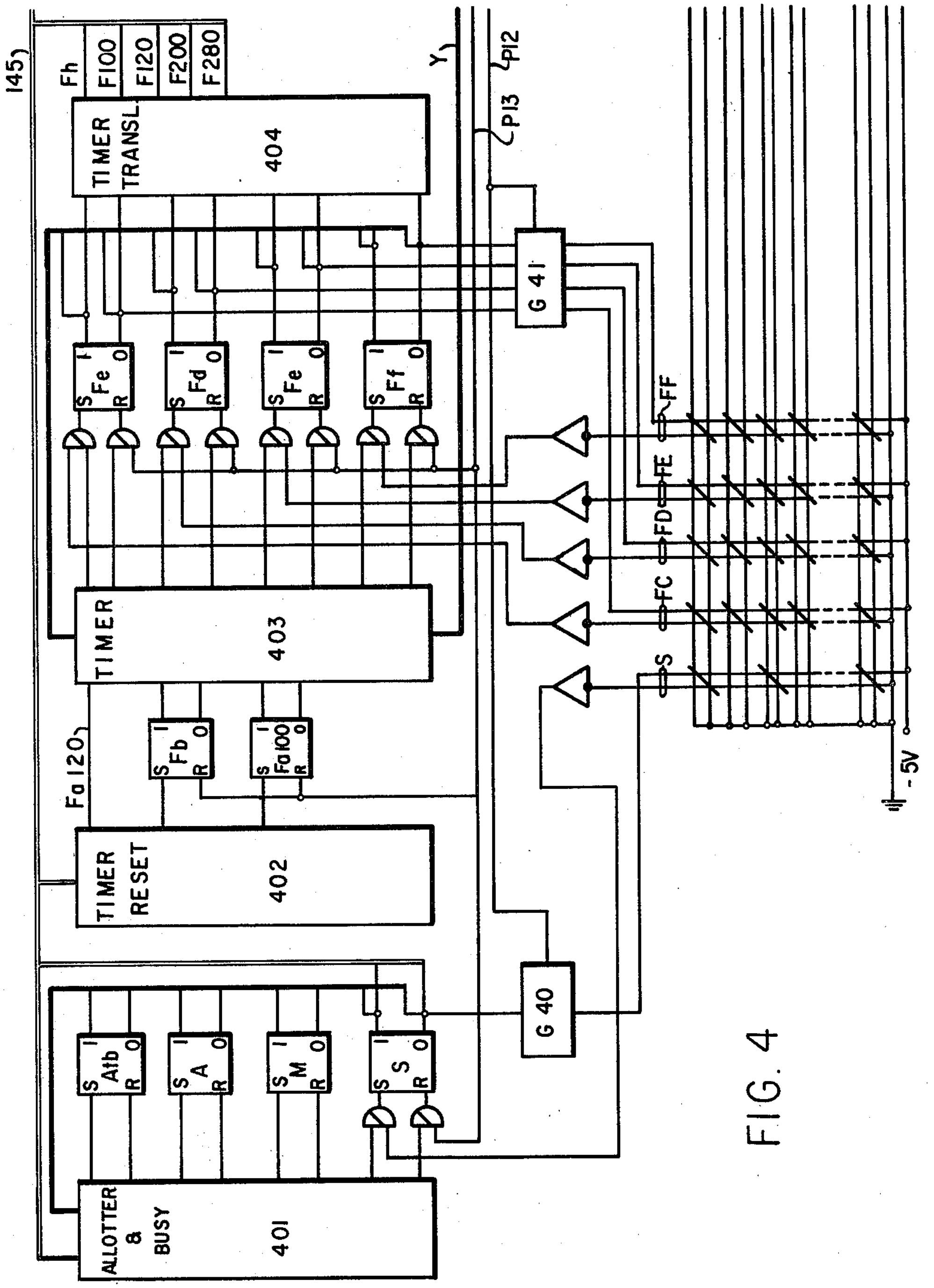
Figure 5:
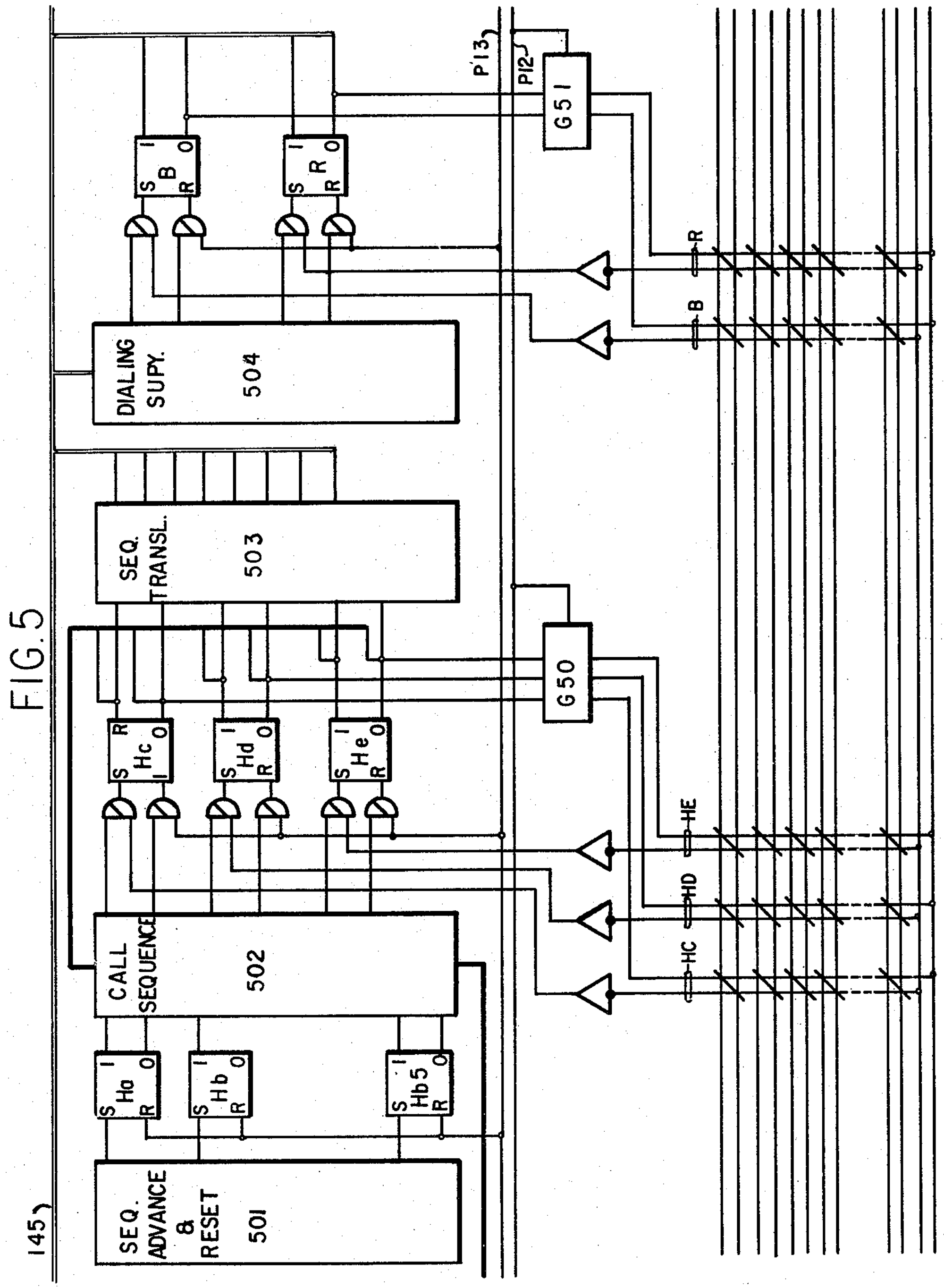
Figure 6:
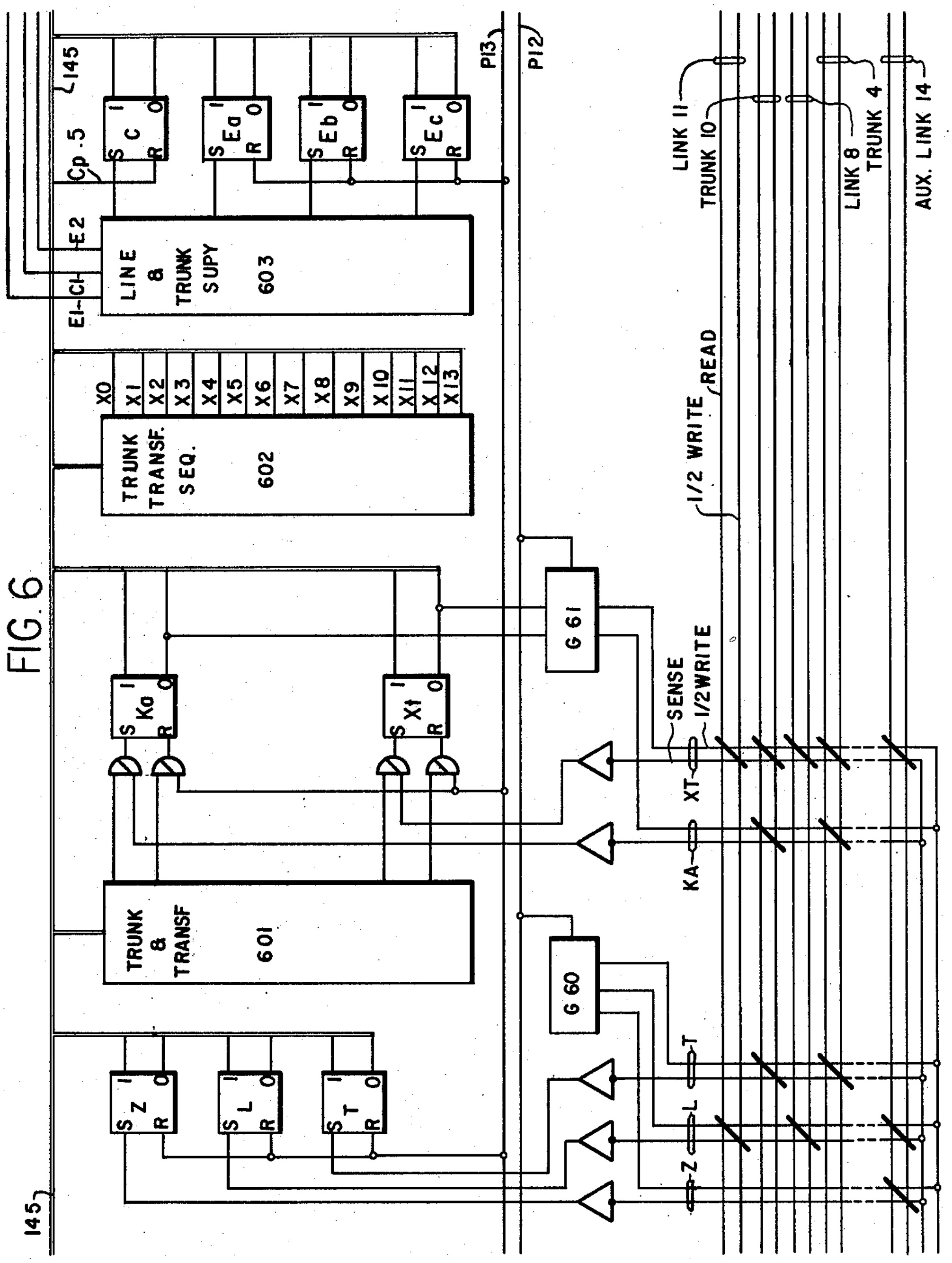
Figure 7:
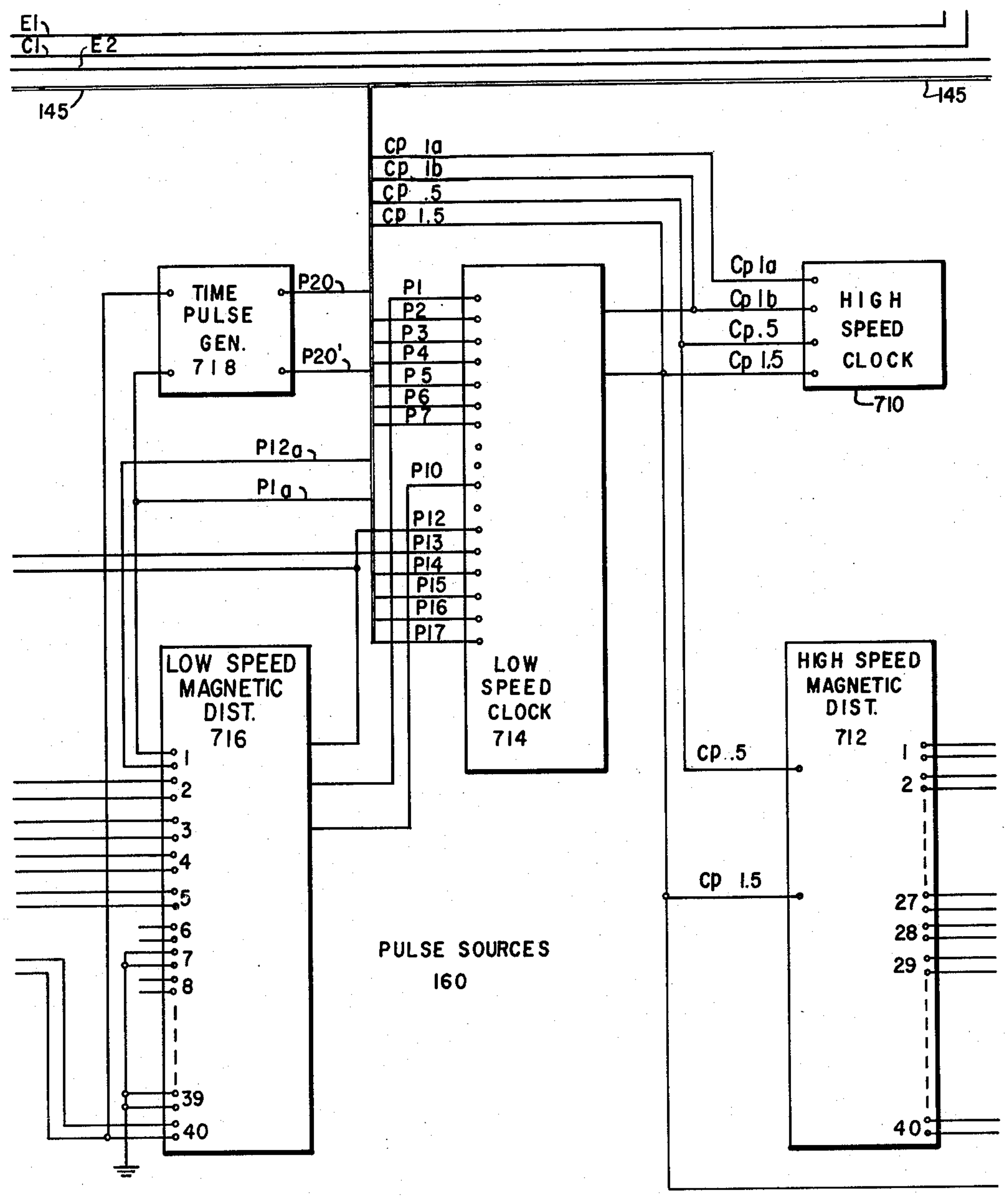

The exchange is shown in generally functional block form in FIGS. 2–9, arranged as shown in FIG. 12. The transmission circuits including the line, link and trunk circuits are shown in FIGS. 2 and 3; the low speed memory and logic 140 is shown in FIGS. 4, 5 and 6; the pulse sources 160 are shown in FIG. 7; and the high speed memory and logic 150 is shown in FIGS. 8 and 9.

Each of the memories comprises a coordinate array of ferrite cores. The low-speed memory is shown extending across the lower sides of FIGS. 4, 5 and 6, and the high-speed memory is shown extending across the lower sides of FIGS. 8 and 9. In each, the horizontal rows are associated with the links and trunks, and the vertical columns are associated with flip-flop type storage devices. Each memory is associated with a separate pulse distributor in the pulse sources 160 to supply pulses to its horizontal conductors in turn. Each horizontal row has a read winding and a 1/2-write winding threaded through all of the cores of the row, and each vertical column has a sense winding and a 1/2-write winding. For each of the memories, during each stage of its distributor, a read pulse is supplied through the read winding of the row, causing the state of each core of the row to be transferred by means of the sense windings to the flip-flops. The information in the flip-flops is then utilized and possibly altered by the associated circuitry. A 1/2-write pulse is applied to the horizontal winding, and coincidently to selected ones of the vertical windings to return the information from the flip-flops to the cores. This is repeated, in turn, for each horizontal row during successive stages of the distributor.

The high-speed memory comprises cores in five columns TC to TG for registering the tens digit, five columns UC to UG for registering the units digit, and five columns BT, DT, RG, RT, and ST for registering the signal states. Each horizontal row is associated with one time slot of the multiplex transmission. Each stage of the distributor comprises a 0.5-microsecond read pulse followed by a 1.5-microsecond 1/2-write pulse in a 2-microsecond time slot. The horizontal 1/2-write windings are connected at one end to the distributor and at the other end over line DP to the link and trunk circuits for transmission control. The 1/2-write windings of the first two rows are connected over leads DP1 and DP2 to link LK1 to control the calling party and called party transmission respectively. Successive pairs of horizontal rows 3 to 28 are in like manner coupled to successive links LK2 to LK14, so that each link is permanently associated with two high-speed memory rows corresponding to two transmission time slots, one for the calling party and the other for the called party. Each trunk circuit is permanently associated with one high-speed memory row corresponding to one transmission time slot. The horizontal rows 29 to 40 are coupled respectively to the trunk circuits TK1 to TK12.

The low speed memory has one horizontal row for each link and one row for each trunk, a total of 26 rows. Column S (FIG. 4) having cores only in the link rows, is associated with the allotter and indicates which link is in scanning condition. Columns FC, FD, FE and FF are associated with the timer in the form of a binary counter for measuring elapsed time in steps of 20 milliseconds, for loop supervision. The columns HC, HD and HE (FIG. 5) are used to register the call sequence state. The columns B and R are used for dialing and loop supervision. The columns Z, L and T are used to identify links and trunks. Column L has cores only in the link rows, and column T has cores only in the trunk rows. Column Z has only one core, in the auxiliary link row, which is the last row of the low speed memory. Column KA has cores only in the trunk rows, and is set to designate an incoming call. Column XT is used to designate that a link or trunk is engaged in a transfer operation.

A register is defined as comprising a column of cores in either memory and the associated flip-flop. For a particular link or trunk, the register is the individual core of the column, and the associated flip-flop during the time it is used by that link or trunk.

C. PULSE SOURCES AND DEFINITIONS (FIG. 6)

The pulse sources 6 are shown in FIG. 7. The primary source is a high speed clock 710. The output pulses from this clock drive a distributor 712 for driving the high speed memory and supplies pulses for the transmission circuit. The output of the high speed clock 710 also drives a low speed clock 714 which includes a seventeen-stage distributor primarily for controlling logic circuits in the low-speed logic. Pulses from the low speed clock 714 also drive a distributor 716 which drives the low speed memory. A timing pulse generator 718 is driven by pulses from distributor 716 to control the timer circuit 403.

In reference to the pulses, the following definitions relate to the terms used in this application:

*Time slot.*—A two-microsecond interval, being one complete cycle of the high-speed clock 710. Each time slot comprises a 0.5-microsecond guard interval followed by a 1.5-microsecond interval during which transmission and various control operations take place.

*Transmission cycle.*—A time interval comprising 40 time slots or 80 microseconds, being one cycle of the distributor 712.

*Logic cycle.*—A time interval comprising 17 time slots or 34 microseconds, being one cycle of the low speed clock 714.

*Frame.*—A time interval comprising 40 logic cycles totaling 680 time slots or 1360 microseconds, being one cycle of the distributor 716.

*Timer step.*—An interval of 20.4 milliseconds, being one cycle of the timing pulse generator 715.

*Coincident.*—Used with reference to two or more signals which overlap in time, usually at the input of a gate.

*Simultaneous.*—Used with reference to signals or events occurring during the same time cycle, such as a transmission cycle or a frame, although possibly in different time divisions of the cycle.

FIG. 10 is a graph of the pulses produced during each time slot by the high speed clock 710. The pulses on lead *Cp* .5 occur during the guard interval and have a duration of 0.5 microseconds. The pulses on lead *Cp* 1.5 occur during the remainder of the time slot and have a duration of 1.5 microseconds. The pulses on lead *Cp* 1*a* and *Cp* 1*b* each have a duration of 1 microsecond and occur during each time slot as shown.

The distributor 712 has forty stages and is driven one stage per time slot. The input is supplied by the pulses on leads *Cp* .5 and *Cp* 1.5 from the high speed clock 710. Each stage drives a row of the high speed memory, and has two output leads threaded through the cores of the corresponding row. One of the outputs of each stage is a 0.5 microsecond pulse for applying a read-out potential to the cores. As shown in FIG. 9, each of these leads is connected to ground on the right hand side of the memory. The other output from each stage is a 1.5 microsecond signal for supplying a 1/2-write potential to the cores. The leads from these outputs extend through the memory to the distributor pulse leads DP1 to DP40, which are connected individually to transmisison gates of the links and trunks. Lead DP1 is connected to the calling side transmisison gate, and lead DP2 is connected to the called side transmission gate of link 1. The succeeding pairs of the leads DP3–28 are connected to succeeding links, each odd-numbered distributor pulse being supplied to a calling side gate, and each even-numbered distributor pulse being supplied to a called side gate of a link. Leads DP29–40 are connected to individual trunks. Thus, each of the forty distributor pulses corresponds to one time channel of the multiplex transmission, and is permanently associated with a link or trunk transmission gate.

FIG. 11 is a graph of the pulses produced by the low speed clock 714. This clock is driven by pulses on lead *Cp* 1*b* and *Cp* .5 from the high speed clock 710, and is driven one stage per time slot. There are seventeen stages in its cycle for a total of 34 microseconds. The output of the first three stages are combined to produce a continuous six-microsecond pulse on lead P1. During each of the stages 4 to 13 output pulses are produced on leads P2 to P11 respectively each having a duration of 1.5 microseconds coinciding with the pulse on lead *Cp* 1.5. The output of the stages 14 to 16 are combined to produce a continuous six-microsecond pulse on lead P12. During stage 17 a 1.5-microsecond pulse is produced on lead P13. The pulses P1 to P13 comprise one logic cycle. The pulses P14 to P17 are additional pulses within the cycle, each of two microseconds duration. Pulse 14 is produced during all of stage 4, and pulse P15 is produced during all of stage 5. Pulse P16 starts 0.5 microsecond after the beginning of stage 3, and pulse P17 starts 0.5 microsecond after the beginning of stage 4.

The distributor 716 has forty stages, and is driven one stage per logic cycle by input pulses on leads P1 and P12 from the low speed clock 714. The output from the even-numbered stages are used to drive the horizontal rows of the low speed memory. There are two leads for each row. On one of the leads a read-out potential is applied during the interval coinciding with the pulse on lead P1, and on the other a 1/2-write potential is supplied during the interval coinciding with the pulse P12. Each of the horizontal rows of the low-speed memory is associated with one of the links or trunks. Thus, during each logic cycle, which corresponds to link or trunk distributor stage, a read-out pulse is supplied to one of the rows during the pulse interval P1, transferring the information in this row into the corresponding flip-flops. During the pulse intervals P2 to P11 various logical operations occur in the low-speed logic, which may alter some of this information. During the pulse interval P12 a 1/2-write potential is applied to this horizontal row and to the selected ones of the vertical columns to write the information back into the cores. During the pulse interval, P13 the flip-flops are cleared in preparation for the next logic cycle, which corresponds to another link or trunk. The pulse sources are described in detail in reference 4.

D. TIME DIVISION DISTRIBUTION PLAN

In this system there are two groups of time division multiplex circuits having different distribution cycles, one of the groups being associated with the high-speed memory and logic 150, and the other group being associated with the low-speed memory and logic 140.

D1. *High-Speed Circuits*

The high-speed circuits control the time division transmission of voice and tone signals over the multiplex line ML1–ML2. Referring to FIG. 1, and also to FIGS. 2, 3, 8, and 9, the high-speed circuits include the high-speed clock 710, the high-speed magnetic distributor 712, the high-speed memory and logic 150 (FIGS. 8 and 9), all of the line circuits LC11 to LC80, all of the link circuits LK1 to LK14, the trunk circuits TK1 to TK12, the signaling circuits 170, and the transmission control unit 110. The high-speed clock 710 has a cycle of two microseconds which is referred to as a time slot. As shown in FIG. 10, the time slot is divided into 0.5-microsecond and 1.5-microsecond intervals, corresponding to the respective outputs *Cp* .5 and *Cp* 1.5 from the clock. The output pulses from the clock 710 drive the high-speed magnetic distributor 712. This distributor has forty stages of two microseconds each, making a total cycle of eighty microseconds. Each cycle of this distributor is one transmission cycle on the multiplex line ML1–ML2, and each stage occurring in successive cycles comprises one transmission channel. In each channel transmission occurs during the 1.5-microsecond interval, and the 0.5-microsecond interval is used as a guard interval between channels. The distributor 712 has two output leads for each stage, and for each stage the pair of output leads are threaded through one horizontal row of the high speed memory. On one of the leads a read pulse is delivered during the 0.5-microsecond interval, and on the other a 1/2-write pulse is delivered during the 1.5-microsecond interval. The writing leads extend through the memory and thence to the links and trunks to form the principal distributor pulse output leads. For each link the odd numbered DP pulse is used for controlling the calling line gate, and the even numbered pulse is used for controlling the called line gate. Thus, each link uses two adjacent channels in the transmission cycle for a connection between two lines. Each trunk uses one channel.

The line number register (FIG. 8) in conjunction with the associated cores in the high speed memory delivers pulses to the line circuits in coincidence with the pulses delivered to the link or trunk transmission gates with which they have been selectively connected.

In accordance with stored information in the high speed memory, the line number register (FIG. 8) delivers pulses to the line circuits, and the signal state register (FIG. 9) delivers pulses to the signaling circuit 170 and to the link circuits LK1 to LK14 and trunk circuits TK1 to TK12, so that for each channel for which a connection has been established, two transmission gates connected to the multiplex line, one at the end ML1 and the other at the end ML2, are pulsed in coincidence.

D2. *Low Speed Circuits*

The low speed circuits provide for time division sharing of the circuits used in performing most of the logical operations required by the links to set up connections between lines. Referring to FIGS. 1, 4, 5, 6 and 7, these circuits comprise the low-speed clock 714, the low-speed magnetic distributor 716, the low-speed memory and logic 140 (FIGS. 4, 5, and 6), and a timing pulse generator 718.

The low-speed clock 714 is a distributor which produces thirteen output pulses requiring a total of seventeen time slots or thirty-four microseconds, and four additional output pulses as shown in FIG. 11. This clock cycle is referred to as a logic cycle and is one time division of the total low-speed cycle. The low-speed magnetic distributor 716, driven by the pulses P1 and P12 from the output of the low-speed clock, has forty stages. Each cycle of this distributor is one complete low-speed cycle, and is referred to as a frame. Thus, each such frame comprises forty logic cycles or a total of 1360 microseconds. Certain stages of the distributor 716 are used to drive the twenty-six rows of the low-speed memory, each delivering a read pulse during the pulse interval P1 and a 1/2-write pulse during the pulse interval P12. Each of these memory rows corresponds to one of the links or trunks. During each such logic cycle which corresponds to a link or trunk, in the pulse interval P1 information is transfrered from the low-speed memory to the corresponding flip-flops; during the pulse intervals P2 to P11 the line supervision leads E1, E2, and C are analyzed, the information obtained from the line circuits and memory is used to perform logical operations and to deliver appropriate output signals on the conductors of line 145; during P12 the information, which may or may not have been altered, is transferred back into the same row of the memory; and during the pulse interval P13, the flip-flops are cleared in preparation for the logic cycle of the next link or trunk. Thus, during each frame, each link and trunk shares the low-speed logic for one logic cycle. One logic cycle is used by the allotter, and the other thirteen logic cycles are unused.

Thus, the logic circuits are time shared at a low repetition rate to permit time to perform the various logical operations, while the transmission circuits are time shared at the high repetition rate required for the faithful reproduction of voice signals.

D3. *Time Relation Between Low Speed and High Speed Circuits*

The pulse repetition rates of the different distributors are so arranged that the logic state of each link and each trunk is analyzed and acted on once and only once per frame. The identity of which link or trunk is associated with a logic cycle is established by coincidence of a given logic pulse with a pulse of the high speed circuits. To accomplish this the period of a logic cycle has been chosen to be seventeen time slots, and of a transmission cycle, forty time slots; since these numbers have no common divisor, that is, seventeen is not a prime factor of forty. Thus, each frame comprises seventeen transmission cycles and forty logic cycles, and the relation of coincidence between logic cycles and transmission cycles will repeat only once per frame.

During each logic cycle associated with the links and trunks, the six-microsecond pulse interval P1 is used to read the information from the corresponding row of the low-speed memory into the corresponding flip-flops. For links, the pulse P2 is then used to identify the calling line associated with the link, and pulse P3 to identify the called line. For trunks, the pulse P2 identifies the associated line. In the high speed circuits, each link is associated with a pair of rows and corresponding distributor pulses in the high speed memory, the calling line being associated with an odd-numbered DP pulse and the called line with the following even-numbered DP pulse. The trunks are each associated with one row and distributor pulse. Table I shows the relation of the pulses of the transmission cycles and logic cycles. The table shows that in transmission cycle 1, pulses DP4 and DP5 coincide with pulses P2 and P3 respectively of logic cycle 1, the pulses DP21 and DP22 with P2 and P3 of logic cycle 2, and DP38 and DP39 with P2 and P3 of logic cycle 3. In transmission cycle 2 DP15 and DP16 coincide with P2 and P3 of logic cycle 4, and DP32 and DP33 with P2 and P3 of logic cycle 5. At the end of the frame in transmission cycle 17 DP10 and DP11 coincide with P2 and P3 of logic cycle 39, and DP27 and DP28 with P2 and P3 of logic cycle 40. Table I shows which pulse transmission cycle pulses coincide with the logic cycle pulses P2 and P3 for all logic cycles.

TABLE I

| Logic Cycle No. | Pulse Coincidence | | PAX 20 Links | PABX 14 LINKS 12 TRUNKS |
|---|---|---|---|---|
| | P2 | P3 | | |
| 1 | DP4 | DP5 | | Allotter. |
| 2 | 21 | 22 | Link 11 | Link 11. |
| 3 | 38 | 39 | | Trunk 10. |
| 4 | 15 | 16 | Link 8 | Link 8. |
| 5 | 32 | 33 | | Trunk 4. |
| 6 | 9 | 10 | Link 5 | Link 5. |
| 7 | 26 | 27 | | |
| 8 | 3 | 4 | Link 2 | Link 2. |
| 9 | 20 | 21 | | |
| 10 | 37 | 38 | Link 19 | Trunk 9. |
| 11 | 14 | 15 | | |
| 12 | 31 | 32 | Link 16 | Trunk 3. |
| 13 | 8 | 9 | | |
| 14 | 25 | 26 | Link 13 | Link 13. |
| 15 | 2 | 3 | | |
| 16 | 19 | 20 | Link 10 | Link 10. |
| 17 | 36 | 37 | | Trunk 8. |
| 18 | 13 | 14 | Link 7 | Link 7. |
| 19 | 30 | 31 | | Trunk 2. |
| 20 | 7 | 8 | Link 4 | Link 4. |
| 21 | 24 | 25 | | |
| 22 | 1 | 2 | Link 1 | Link 1. |
| 23 | 18 | 19 | | |
| 24 | 35 | 36 | Link 18 | Trunk 7. |
| 25 | 12 | 13 | | |
| 26 | 29 | 30 | Link 15 | Trunk 1. |
| 27 | 6 | 7 | | |
| 28 | 23 | 24 | Link 12 | Link 12. |
| 29 | 40 | 1 | | Trunk 12. |
| 30 | 17 | 18 | Link 9 | Link 9. |
| 31 | 34 | 35 | | Trunk 6. |
| 32 | 11 | 12 | Link 6 | Link 6. |
| 33 | 28 | 29 | | |
| 34 | 5 | 6 | Link 3 | Link 3. |
| 35 | 22 | 23 | | |
| 36 | 39 | 40 | Link 20 | Trunk 11. |
| 37 | 16 | 17 | | |
| 38 | 33 | 34 | Link 17 | Trunk 5. |
| 39 | 10 | 11 | | |
| 40 | 27 | 28 | Link 14 | Link 14 (Aux.). |

Since there are forty time channels in a transmission cycle, in a PAX as disclosed in references 1–3, using two time channels per link, twenty links may be accommodated. Link 1 is assigned pulse DP1 for the calling line and pulse DP2 for the called line. In the logic cycle assigned to this link the pulses P2 and P3 must coincide respectively with these distributor pulses. The table shows that this occurs in logic cycle number 22. The column headed PAX shows the assignment for all of the links. Note that only the even-numbered logic cycles may be used. In the odd-numbered logic cycles, the pulse P2 coincides with a called line pulse and P3 coincides with the calling line pulse. Therefore these logic cycles cannot be associated with rows of the low speed memory.

In a PABX as disclosed herein, each trunk circuit requires only one time position of the transmission cycle. The trunk circuit may therefore be identified in the low speed circuits by the coincidence of the pulse P2 of a logic cycle with the single transmission cycle pulse. The column headed PABX shows the assignment of logic cycles with 14 links and 12 trunks. In this case all of the even-numbered logic cycles and some of the odd-numbered logic cycles are used, each of which is assigned a row of a low speed memory. Logic cycles in which P2 coincides with the called line of a link cannot be used for low speed memory rows. One of the logic cycles which is not used in the memory is logic cycle 1. This output from stage 1 of the distributor 716 is used by the allotter. For the other unused logic cycles, indicated by a dash in Table I, the outputs from distributor 716 are connected directly to ground.

E. TRANSMISSION CIRCUITS (FIGS. 2 AND 3)

There are many time division multiplex switching arrangements known in the art which are suitable for use in this exchange, some of which use a single two-way transmission highway (two-wire) and others of which use separate one-way transmission highways (four-wire). The exchange as disclosed in references 1–3 uses the two-way transmission arrangement disclosed in reference 5 (U.S. Patent 2,987,577). There are also known two-way multiplex transmission arrangements using resonant transfer. The multiplexing units in the line, link, trunk and signalling circuits will be of a design determined by the type of multiplex arrangement used. It will be assumed that these multiplexing terminations and the transmission control unit 110 are as shown in references 1–3 and 5.

E1. *Line Circuits*

In the line circuits the loop detecting and signal control unit 240 supplies transmission battery to the substation, detects the loop condition, and controls the ringing signal supplied to the substation. The closed loop condition is indicated by a negative potential on conductor 253 to gate 236. The multiplexing unit 220 is coupled between the voice frequency signals at transformer 210 and the multiplex highway ML1. When the line circuit is busy the unit 220 also supplies a busy guarding signal in the form of a negative potential on conductor 252 to gate 234. The various units and gates in the line circuits are controlled in accordance with the pulses supplied over line 132 from the number translation unit 814 of the high speed circuits. For example the line circuit LC11 is enabled when pulses appear in coincidence on leads T1 and U1. This will occur in the time slot of one of the finder, connector or trunk transmission gates to which this line circuit is selectively connected. During this time slot the multiplex unit is enabled to apply a pulse to highway ML1, and also enables the ringing circuits of unit 240 and the gates 234 and 236. If the loop is closed by the substation S11 being off hook a pulse appears during this time slot from gate 236 to the line loop supervision highway E1. If the line circuit has been busy for substantially more than one frame a negative potential appears on lead 252, even when the line loop is interrupted by dial impulses, and gate 234 is enabled during the time slot to apply a busy guarding signal to the highway C1. If the substation is being called, ringing control signals are applied over conductors in line 133 to the unit 240 which in conjunction with the enabling pulses on leads T1 and U1 cause the ringing signals to be applied to the substation.

E2. *Link Circuits*

Each of the link circuits contains essentially only two multiplex transmission gates each of which has an individual input enabling pulse connection from the corresponding row of the high speed memory, and a common start signal input from conductor 921. For example link LK1 has enabling lead DP1 connected to its finder multiplex transmission gate TG2, and enabling lead DP2 connected to its connector multiplex transmission gate TG3. Each of these gates is enabled when a start signal pulse appears on lead 921 in coincidence with the pulse on its individual DP enabling lead.

E3. *Trunk Circuits*

Each of the trunk circuits includes one multiplex gate similar to the multiplex gates in the link circuits. For example in trunk TK1 its multiplex gate TG4 has an individual connection from its enabling lead DP29 and a connection to the common start conductor 921. This unit also generates a busy guarding signal having an input to gate 334 which when enabled by the pulse from lead DP29 supplies a busy guarding signal to the highway C1.

For outgoing signalling the trunk circuit includes a loop closure unit 350 which is enabled by signals from line 145 in coincidence with pulses in its time slot on lead DP29 to control a flip E*t*. This flip flop in turn controls a relay 330 having contacts 351 in the loop to the central office.

Incoming signals are received by the unit 340. This unit controls a gate 336 enabled by the pulse on lead DP29 to supply a pulse in the trunk's time slot on the trunk supervisory highway E2. The unit 340 also has connections through control conductors in line 145. There are many possible arrangements for accomplishing the incoming signalling. One such possible arrangement would be a ring down trunk circuit with dialing by a local operator into the electronic exchange; and another possible arrangement would be a trunk circuit with two way dialing from the central office. The signalling may be over the loop or by any other conventional arrangement.

E4. *Signalling*

The signalling unit 170 may contain multiplex transmission gates to supply signalling tones to the calling line, and ringing generators and interrupters for supplying signals over line 133 to the line circuits, as disclosed in references 1–3.

F. LOW SPEED LOGIC AND MEMORY (FIGS. 4, 5 AND 6)

The low speed circuits include several logic circuits associated with flip flops and columns of the low speed memory. These logic units, especially those of the timer, call sequence, and dialing supervision, are substantially the same as those disclosed in references 1–3, with some modifications to incorporate the PABX features and to improve the operation. In describing the arrangement and operation Boolean algebra equations are incorporated to facilitate the explanation. The combined equations for each logic unit are for convenience grouped together in section H.

The low speed circuits include three categories of flip-flops, which are referred to as recirculating flip-flops, dynamic flip-flops, and static flip-flops.

The recirculating flip-flops are those associated with individual columns of the low speed memory. These flip-flops are indicated by having an OR gate at both the set and reset inputs. Each of these OR gates has one input from the associated logic unit. The sense winding of the corresponding column from the memory is coupled through an amplifier and the OR gate to the set input of the flip-flop. At the reset inputs each of the OR gates has its other input connection to the pulse lead P13. During each logic cycle, in the interval of pulse P1, if the column of the memory has a core corresponding to that logic cycle and if it is in the set condition it switches to produce an output pulse which is applied through the amplifier and the OR gate to set the flip-flop so that its output 1 is true and its output 0 is false. During the portion of the logic cycle of the pulses P2–P11, signals from the logic unit may be supplied to change the condition of the flip-flop. During the pulse interval P12 the condition of the flip-flops is rewritten back into the memory cores of that logic cycle. The units G40, G41, G50, G51, G60 and G61 include constant-current generators, there being one such generator in each unit for each memory column associated therewith. Each of these generators has one input from the pulse source P12, and each of the units except those for the identification flip-flops Z, L, and T have an input from the 0 output of the associated flip-flop. As explained in references 1–3, the 0 signal is used for convenience in driving the amplifiers, which invert the signal. Thus if the flip-flop was in the set 1 condition the constant-current generator applies a signal which is of half the amplitude required to set the core and is therefore referred to as a 1/2 write signal. At the same time the distributor 716 applies another 1/2 write signal to the horizontal winding so that if the two signals occur in coincidence the core is set. Thus the registered condition for each logic cycle having a core in the low speed memory is recirculated so that it appears in the flip-flop during the associated logic cycle and in the core during the remainder of the frame. These flip-flops are reset during the pulse interval P13 in preparation for the next logic cycle.

A low-speed memory register for a link or trunk comprises a recirculating flip-flop during the individual logic cycle of the link or trunk and the core in its row during the remainder of the frame.

The dynamic flip-flops are those having their set input supplied from the associated logic unit, and their reset input supplied from the pulse source P13. Thus these flip-flops are selectively set or not set during each logic cycle in accordance with the logical conditions existing at that time. Each of these flip-flops is reset during the pulse interval P13 in preparation for the next logic cycle.

The static flip-flops are those having their set and reset inputs only from the associated logic unit. Thus these flip-flops may be set in any logic cycle associated with a link or trunk, and will remain set through succeeding logic cycles until reset by the logic cycle of the same or another link or trunk. These flip-flops may therefore be used to convey information from one link or trunk to another.

F1. *Allotter and Busy Logic*

The allotter logic in unit 401 is associated with one recirculating flip-flop S and two static flip-flops A and M. The memory column and flip-flop S is to register and indicate which link is in scanning condition. The output of this flip-flop is used in the line finding operation which causes an idle link to continually search until a calling line condition is found, and to then seize that line. The flip-flops M and A are used to determine whether or not any link is scanning and to initiate scanning.

At the beginning of each frame, the logic cycle 1 is the allotter logic cycle. Pulses P1*a* and P12*a* are supplied to the allotter in the pulse intervals P1 and P12 of this logic cycle. After the end of each frame logic cycle 40 is the logic cycle of link 14. This link is used as an auxiliary link, and is identified by the core and flip-flop Z, in addition to the link core in column L. The auxiliary link is provided for initiating outgoing trunk calls when all other links are busy. It cannot be used to complete a local call to another line. The allotter is arranged so that the auxiliary link is in scanning condition as indicated by the setting of its S core, only if all the other links are busy.

At the end of the allotter logic cycle of each frame the flip-flop M is set.

$$M = P12a$$

If during the frame any link is found to be in scanning condition flip-flop M is reset.

$$M' = S\ P4\ Z'$$

If no link is found in scanning condition the flip-flop M remains set and at the beginning of the logic cycle of the next frame flip-flop A is set.

$$A = M\ P1a$$

Then if during the frame an idle link is found as indicated by the output from the call sequence circuit being in the normal condition H*n*, the register S is set for that link. Fip-flops M and A are then reset.

$$S = L\ A\ Hn\ P3 + \text{Sense}$$
$$M' = S\ P4\ Z'$$
$$A' = S\ P7\ Z'$$

The auxiliary link is in the last logic cycle of the frame and therefore the register S for this link will not be set to cause scanning unless all of the other links are busy. Furthermore when scanning is initiated in the auxiliary link the flip-flops M and A are not reset because of the condition Z' in the corresponding equations. Therefore when any other link becomes idle its register S will be set and scanning initiated in the normal manner, and the flip-flops M and A reset. With flip-flop A reset the register S of the auxiliary link will be reset at the end of that frame.

$$S' = Hn\ Z\ A'\ P6$$

When a scanning link is seized by a calling line, the call sequence switch goes off normal and this causes the register S to be reset.

$$S' = Hn'\ P6$$

The logic unit 401 is also associated with the all trunks busy static flip-flop A*tb*. The operation of this flip-flop will be explained in describing the operation of the trunk circuits.

F2. *Timer* (*FIG. 4*)

The timer proper comprises the logic unit 403 and the recirculating flip-flops F*c*, F*d*, F*e*, and F*f*, along with the associated memory columns. This is essentially a binary counter. There is one complete frame out of each 15 frames during which the timer may be advanced, for all links and trunks. This is controlled by the output on leads P20 and P20' of the timing pulse generator 718 (FIG. 7). This generator has a cycle of fifteen frames. During the first complete frame of each cycle designated a P20 frame, the output is true on lead P20 and false on lead P20'. During the next fourteen frames designated P20' frames, the output is false on lead P20 and true on lead P20'. Since each frame has a period of 1360 microseconds, each cycle of the timing pulse generator has a period of 20.4 milliseconds. Since this is approximately 20 milliseconds, the timer states are designated in multiples of 20, representing the approximate number of milliseconds, which have elapsed from the beginning of the count. The normal state with all registers set 0 is designated F*n*. Successive states are designated F0, F20, and so on up to F280 and then back to F*n*. During the P20 frame, in the logic cycles of links and trunks in which the output of flip-flop B is true the timer is advanced.

Two delay lines (not shown) are included in the logic unit 403. These delay lines are shared with the sequence circuit by way of the conductors in line Y. Each of these delay lines produces a delay of two microseconds, corresponding to one time slot. For each delay line the input may be from the timer during P20 frames or from the sequence circuit during P20' frames. For the first delay lines the input is Y1T or Y1S, and the output is designated Y2. For the second delay line the input is Y3T or Y3S and the output is designated Y4. A complete description of the operation of the counters in the timer and in the sequence circuit may be found in references 1–3.

The timer may be reset for any link or trunk under control of the timer reset logic 402, and two dynamic flip-flops F*b* and F*b*100. The normal reset is by way of flip-flop F*b*. Whenever this flip-flop is set in a P20 frame, the timer is reset to state F*n*. Under certain conditions it is desirable to return the timer to stage F100. This is done by way of flip-flop F*b*100. When a line is called and found to be busy, a special signal F*a*120 is used to advance the timer to state F120.

The timer translation logic 404 is used to translate the output signals from the flip-flops to supply the required timer state signals to the other logic units.

F3. *Call Sequence Switch*

The call sequence switch comprises the logic unit 502 and the three recirculating flip-flops H*c*, H*d*, and H*e*, along with the associated memory columns. This circuit is a binary counter which operates essentially the same as the timer counter. It uses the delay lines in the timer 403 over the conductors in line Y, as explained for the timer.

The call sequence switch is advanced and reset under control of the logic unit 501 and its associated dynamic flip-flops H*a*, H*b*, and H*b*5. The sequence circuit is advanced whenever the flip-flop H*a* is set during a P20' frame. The call sequence switch is reset to its normal state H*n* in any frame in which the flip-flop H*b* is set. The flip-flop H*b*5 is used to reset the sequence to state H5 under certain conditions.

The sequence translation logic 503 is used to translate the outputs of the flip-flops H*c*, H*d* and H*e* to supply the eight sequence state signals to the other logic units. The first output condition H*n* is the normal output whenever the corresponding link or trunk is idle. The other seven outputs represent other various states of a call.

F4. *Dialing Supervision*

The dialing supervision unit comprises the logic 504 and associated recirculating flip-flops B and R along with the corresponding memory columns. The register B is normally set in the logic cycles of a link or trunk which is in an off normal sequence state and the calling line goes to an open loop condition. There are several conditions under which register B is reset, one of them being when the sequence switch advances. Thus during dialing the register B is set at the beginning of a digit and remains set during the entire series of impulses for the digit, and is reset at the end of the digit by the sequence switch advancing. Register B may also be reset by the timer advancing to state F280, indicating a disconnect by the calling line.

The register R supervises the individual dial impulses. At the beginning of each dial impulse register R remains reset until an advance signal is sent to the line number register, and it remains set for the duration of the impulse, being reset at the end of the impulse when the line loop is again closed.

F5. *Identification of Link and Trunk Logic Cycles*

The flip-flops Z, L, and T and associated memory columns are used to identify the link and trunk logic cycles. The column L has cores in link rows only, and the column T has cores in the trunk rows only. The auxiliary link 14 has a core in the L column, and in addition has a core Z. Thus the flip-flop L identifies the logic cycles which are associated with links, and the flip-flop T identifies logic cycles associated with trunks. The flip-flop Z identifies the auxiliary link. Write current is supplied to the cores of these three columns so that they will always be in the set condition after the P12 interval of any logic cycle.

F6. *Trunk and Transfer*

The logic unit 601 is associated with the recirculating flip-flops K*a* and X*t* and the corresponding memory columns. The column K*a* has cores in the trunk rows only. The register K*a* is set to indicate an incoming trunk call. The register X*t* is used to indicate a link or trunk which is engaged in a transfer operation.

The trunk transfer sequence circuit 602 contains both logic and bistable devices such as flip-flops to indicate the transfer sequence states during a transfer operation. The flip-flops may be arranged either in a binary form or in a ring counting form. The output X0 is the normal condition indicating that the transfer circuit is idle. The outputs X1 to X9 are used in transferring a trunk connection from one line circuit to another line circuit. The output X10 is a spare. The outputs X11, X12 and X13 are used in initiating an outgoing call to transfer the calling line from a link to an idle trunk.

F7. *Line and Trunk Supervision*

The line and trunk supervisory logic 603 is associated with three dynamic flip-flops E*a*, E*b*, and E*c*, which indicate the loop condition for dialing and hookswitch supervision. The flip-flop C is reset in every time slot by the C*p* .5 output of the high speed clock 710 (FIG. 7). This flip-flop C repeats the busy guarding signals from the highway C1. It is also set during the time slot in which a called line is being rung.

The flip-flops E*a*, E*b*, and E*c* are set in accordance with the coincidence of high speed and low speed cycles as explained in section D3. The flip-flop E*a* indicates the loop condition of a local calling line, the flip-flop E*b* indicates the loop condition of a local called line on either a local call or an incoming trunk call, and the flip-flop E*c* indicates the trunk condition. On a local call during the link logic cycle, the flip-flop E*a* is set during time slot P2 if the calling line is off hook, and the flip-flop E*b* is set during time slot P3 if the called line is off hook. The flip-flop E*a* is also set during time slot P2 on an outgoing trunk call. On an incoming trunk call the flip-flop E*b* is set during time slot P2 if the called line is off hook. The trunk flip-flop E*c* is always set during the time slot P2 of a trunk logic cycle if that trunk is supplying pulses to the trunk supervision highway E2.

G. HIGH SPEED LOGIC AND MEMORY (FIGS. 8 AND 9)

The high speed memory and associated flip-flops recirculate information once per high speed memory cycle of 40 time slots. In each time slot, during the first 0.5 microsecond the condition of each core in the row is read into the corresponding flip-flop, those flip-flops being set which receive from the sense winding a pulse produced by a core which was set, and the other flip-flops are reset during this 0.5-microsecond interval. During the remaining 1.5-microsecond portion of the time slot the information of the flip-flops is utilized and is also written back into the cores in the same or modified form.

G1. *Line Number Register* (*FIG. 8*)

The line number register comprises a tens register having five flip-flops T*c*–T*g* and associated memory columns for registering the tens digit in a two-out-of-five code; and a units register comprising the five flip-flops U*c*–U*g* and associated memory columns for registering the units digit in a two-out-of-five code. During the 1.5-microsecond interval of each time slot the number represented by the setting of the flip-flops is translated by the line number translation unit 814 to produce a pulse on one of the ten leads T1 to T0, and on one of the ten units leads U1 to U0. The line number recirculation unit 818 contains the logic and constant current generators for rewriting the line number into the memory. Whether the line numbers are written back in the same form or a modified form is determined by the line number advance control 816. Normally the signals on leads T*b* and U*b* are true, so that the same tens and units digits are rewritten. If the signal on lead T*a* is true, the signal on lead T*b* is inhibited, and the tens digit is advanced one number; and if the signal on the lead U*b* is true, the signal on lead U*b* is inhibited, and the units digit is advanced one number. The rewrite signals on leads T*b* and U*b* may also be inhibited to clear the line number cores of a row. The equations of the line number advance logic of unit 816 are in section H12. The recirculation logic of unit 818, as well as that of translation unit 814, is given in references 1–3.

G2. *Transfer Row*

The high speed memory includes a row having cores in the ten line number columns. This row is used in transferring a line number from one of the rows of a link or trunk to a row of another link or trunk. The read and write input pulses to this row are applied via leads 821 and 822 respectfully from generators in unit 812. These generators are controlled by logic in the transfer row writer 810, which supplies output signals to the leads X*r* and X*w* respectfully.

G3. *Signal State Register*

The signal state register comprises the logic unit 901 associated with flip-flops B*t*, D*t*, R*g*, R*t*, and S*t*, and the corresponding memory columns. The busy tone flip-flop B*t*, the dial tone flip-flop D*t*, and the ring back tone R*t* have cores in the calling line rows and trunk rows. The ringing current control flip-flop R*g* has cores in the called line rows and trunk rows only. The switch through flip-flop S*t* has cores in all forty of the high speed memory rows. The 0 output leads from the flip-flops are shaped in respective OR gates with the C*p*. 5 pulse and then applied through inverting amplifiers to their respective output leads. The start signal S*t* is normally applied through a gate 924 to the conductor 921 which is connected to the start input leads of the multiplexing gates of all of the links and trunks. However during a transfer, it is desirable to mute the transmission between the trunk and the connected line circuit. This is accomplished by resetting the flip-flop D*t* at the same time that the flip-flop S*t* is set to mark the muting condition. These signals are supplied to AND gate 922 to a conductor I to inhibit the transmission. This signal inhibits the output of the signal S*t* of gate 924, and is also connected through line 145 to the line number translation unit 814 (FIG. 8) to inhibit the output to the line circuit during the time slot of the trunk.

Each of the five signal states flip-flops may be set during the 0.5-microsecond interval of a time slot by a signal from the sense winding, or during the 1.5 microsecond interval by a signal from the logic unit 901; and each may be reset during the 0.5-microsecond interval by a signal from the lead C*p* .5, or during the 1.5 microsecond interval by a signal from the logic unit 901.

H. COMBINED EQUATIONS

The equations of the various logic units are given in combined form in this section. In other sections of the description, parts of the equations are given in operational sequence, to aid in explaining the operation.

The logic circuitry is direct-coupled (DC), that is, signals are represented by steady-state voltages. Two levels are employed. The first level is usually −5 volts, although other negative voltages are used in a few places, and represents the binary 1, true, on or active condition. The second level, ground potential, represents the binary 0, false, off or inactive condition. Flip-flops are used as registers with double-rail output signals to drive the logic circuits. A double-rail output is one in which both the logical 1 and 0 conditions are represented by active signals on separate leads. Only one of the two leads, however, has an active signal at any time. Logic circuits are included in each unit for controlling the setting of the flip-flops, which may be set 1 or set 0. "Set" when used along means "set 1," and "reset" is synonymous with "set 0." These logic circuits may comprise diode type AND and OR gates.

In describing the logical operations performed by the circuits, Boolean algebra equations are used. In this notation the addition symbol signifies OR, the multiplication symbol, expressed or implied, signifies AND, and the prime symbol signifies the inverted condition. Underlining indicates that a signal is inhibited, so that the output is false.

H1. *Trunk Circuit* (*350*)

Set E*t* =D*px* P2 (R*t*+E*a*+E*b*)
Reset E*t*=H1 K*a*′ E*a*′ D*px* P2
+D*px* P2 F280

H2. *Allotter and Busy* (401)

Set A =M P1*a*
Reset A =S P7 Z′
Set M =P12*a*
Reset M =S P4 Z′
Set S =L A H*n* P3+sense
Reset S =H*n*′ P6
+H*n* Z A′ P6+P13
Set A*tb* =H*a* H*n* P4 T
Reset A*tb*=H*n* C′ P2 T For the option of all regular idle links scanning, the equations are the same as above, except:

Set S=L H*n* P3+Z A H*n* P3+Sense

H3. *Timer Reset* (*402*)

Set F*b* =B E*a* R (X*t*′+X*t* X5)
+B E*c* R
+B H*a* H1 P3 T9′
+F280
+P4 X*t* L (X6+X8+X13)
+H1 K*a*′ E*a* T P2
Set F*b*100 =B E*b* R P8 (H6+H7)
+X*t* P5 X0
+E*a* X*t* X9 P2
Reset F*b*, F*b*100=P13
F*a*120 =H3 P20 F100 P2

H4. *Timer* (*403*)

Set F*c* =P20 (B Y2′ P3+F*a*120)+sense
Reset F*c*=P20 Y2 P3+P10′ F*b* P7+F*b*100+P13
Set F*d* =P20 Y2′ Y4 P4+F*b*100+sense
Reset F*d*=P20 Y2 Y4 P4+P20′ F*b* P7+P13
Set F*e* =P20 Y2′ Y4 P5+F*b*100+sense
Reset F*e*=P20 Y2 Y4 P5+P20′ F*b* P7+P13
Set F*f* =P20 Y2′ Y4 P6+sense
Reset F*f*=P20 Y2 Y4 P6+P20′ F*b* P7+F*b*100+P13

H5. *Sequence Advance and Reset* (*501*)

Set H*a* =P2 S H*n* (E*a* C′+E*a*′ X2)
+P2 B R′ F100 (E*a*+K*a*) (H1+H2)
+C′ H3 F100 (P3 L T9′+P2 T)
+P3 E*b* H4
+E*a*′ P3 E*c* H*n*
+E*b*′ H5 P2 T B′
+E*b*′ H6 P2 B R′
+T H*n* X11 P3
Set H*b* =F280
+P5 X*t* L (X6+X8+X13)
Set H*b*5 =X7 X*t* P3
+X8 X*t* P6 T
Reset H*a*, H*b*, H*b*5=P13

H6. *Call Sequence* (*502*)

Set H*c* =P20′ H*a* Y2′ P5+H*b*5+sense
Reset H*c*=P20′ Y2 P5+H*b*+P13
Set H*d* =P20′ Y2 Y4 P6+sense
Reset H*d*=P20′ Y2 Y4 P6+H*b*+H*b*5+P13
Set H*e* =P20′ Y2′ Y4 P7+H*b*5+sense
Reset H*e* =P20′ Y2 Y4 P7+H*b*+P13

H7. *Dialing Supervision* (*504*)

Set B =H*n*′ E*a*′ P5 L (X*t*′ +X*t* X5)
+H*n*′ E*c*′ P5 K*a*
+P6 (H6+H7)
+H1 K*a*′ E*a*′ T P2
+Sense
Reset B=H*a* P4 T9′
+F280+E*a* F120
+X*t* P5 X0
+H*n* F*n* P8
+H1 K*a*′ E*a* T P2
+T9 F120 P5
+P13
Set R =B P4 (E*a*′ L+E*c*′ K*a*)
+E*b*′ B P7 (H6+H7)
+Sense
Reset R=P3 F*n* (E*a*+E*c*)
+P3 F100 (E*a*+E*b*)
+F280
+H*n* P5
+P13

H8. *Trunk and Transfer* (*601*)

Set X*t* =X0 R′ F200 P2 H7
+S P3 H*n* X2 E*a*′
+T9 P3 L A*tb*′ X0 F100
+sense
Reset X*t* =P7 H*n*+P13
+H5 T P8
Set K*a* =E*a*′ P3 E*c* H*n*
+sense
Reset K*a*=H*n* P7+P13

H9. *Transfer Sequence Circuit* (*602*)

X1 =X*t* P6 X0 T
X2 =X*t* P3 X1
X3 =X*t* P5 X2 L
X4 =X*t* P4 X3 H1
X5 =X*t* P3 X4 H1
X6 =X*t* P7 E*a*′ E*b* H5
X7 =X*t* P6 X6 L
X8 =X*t* P6 E*a* E*b*′ X5 H5
+X*t* P6 E*a* B R′ F200 X9
X9 =X*t* P3 B R′ L E*a*′ (H3+H4)
X11=X*t* P5 X0 T9
X12=X*t* P3 X11
X13=P6 X12 T H*a*
X0 =X*t* P4 X7
+X*t* P4 X8 T H5
+X*t* P6 X13 L

H10. *Line and Trunk Supervision* (*603*)

Set E*a* =E1 P2 K*a*′
Set E*b* =E1 P3 L+E1 P2 K*a*
Set E*c* =E2 P2
Set C =C1+R*g*
Reset E*a*, E*b*, E*c*=P13
Reset C =C*p* .5

H11. *Transfer Row Driver* (*810*)

X*r* =X4 H1 X*t* P14 C*p* .5
+X7 X*t* P14 C*p* .5
+T H*n* X12 P14 C*p* .5
+X8 X*t* P14 C*p* .5
X*w*=X*t* P2 X1 C*p* 1*a*
+E*a*′ E*b* P3 H5 X*t* L C*p* 1*a*
+X*t* P2 X11 C*p* 1*a*

H12. *Line Number Advance* (*816*)

T*a*=U9 S H*n* P2 (C+E*a*′) L C*p* 1*a*
+B R′ E*a*′ H1 P3 L C*p* 1*a*
+B R′ E*c*′ H1 P2 K*a* C*p* 1*a*
U*a*=S H*n* P2 (C+E*a*′) L C*p* 1*a*
+B R′ E*a*′ H2 P3 L C*p* 1*a*
+B R′ E*c*′ H2 P2 K*a* C*p* 1*a*
*Tb*=H*n* P3 L
+H1 B′ P2 K*a*
+H*n* P2 T
+H1 P2 X*t* X3
+P2 T X*t* X6
+(P2+P3) L X*t* X8
*Ub*=H*n* S′ P2 L+(same as *Tb*)
*Tb*=T*a*′ *Tb*′ C*r*′ C*p* 1*a*
*Ub*=U*a*′ *Ub*′ C*r*′ C*p* 1*a*

H13. *Signal State Register* (*901*)

Set B$t$ =H3 P2 F120+sense
Reset B$t$ =H$n$ P2+C$p$ .5
Set D$t$ =H1 P2 (L+K$a$)
+X$t$ X4 T P2
+sense
Reset D$t$=H$n$ P2+H2 P2
+X$t$ X7 P2
+X$t$ X8 P2
+C$p$ .5
Set R$g$ =H4 P3 L
+H4 P2 T
+sense
Reset R$g$=P3 H5 L
+P3 F$n$
+P2 H5 T
+C$p$ .5
Set R$t$ =H4 P2
+sense
Reset R$t$=P2 (H5+F$n$)+C$p$ .5
Set S$t$ =H5 P2+H5 P3 L
+H1 P2 K$a'$ T
+sense
Reset S$t$ =H$n$ P2
+H$n$ P3 L
+H$n$ P2 T
+C$p$ .5

J. OPERATION

The operation of the switching control circuits comprising the low speed memory and logic 140 and the high speed memory and logic 150 comprises principally responding to signals from the three supervisory highways E1, E2, and C1 to control the storage in the high speed memory so that the proper enabling pulses are supplied to the transmission gates to establish the desired effective multiplex connections. In the links this involves a line finder operation to control the calling line rows of the high speed memory, and a connector operation to control the storage in the called line rows of the high speed memory. In the trunks, for an incoming call the operation is essentially the same as the connector operation of a link, with the proper information being stored in the trunk row to effect a connection to the called local line. According to the invention the switching control circuits may operate to transfer a trunk call from one local line to another. For an outgoing call the operation is initiated by way of a link, and then the calling line number is transferred to a trunk row, and the further supervisory and dialing signals from the calling line are out pulsed over the trunk.

J1. *Link—Finder Operation*

When a link becomes idle the units register cores are cleared, and the last used tens digit remains registered in the tens register.

U$b$=H$n$S' P2 L

When the link becomes allotted and starts scanning, as indicated by the setting of its S register, the units register is advanced one number each frame.

U$a$=S H$n$ P2 (C+E$a'$) L C$p$ 1$a$

Each time the units register advances to U9, in the following frame the tens register is advanced one number.

T$a$=U9 S H$n$ P2 (C+E$a'$) L C$p$ 1$a$

Upon the line number register advancing to the number of a calling line initiating a call, a pulse will appear on highway E1 in the finder time slot of the scanning link and therefore during the time slot P2 the flip-flop E$a$ is set.

J2. *Link—Connector Operation*

A link may be seized by a local calling line by line finder operation as described in section J1, or it may be seized during a transfer of a trunk call as indicated in section J4. In either case the connector operation is essentially the same. If the seizure is by line finder operation the transfer register output is false (X$t'$). If the seizure is during a transfer operation, the register X$t$ output is true and the transfer sequence output is in state X5. If an outgoing trunk call is being initiated, the link is seized by line finder operation and the digit 9 is dialed, as described in section J5; causing the timer to continue to run after the end of the digit, and the transfer to an idle trunk to be effected. The equations given in the description of the connector operation to follow indicate all of these different possible modes of operation.

Assume that a call is initiated from substation S11, and that a link is seized. In the line finder high-speed-cycle time slot of this link the gates in the line circuit LC11 will be enabled by the pulses in coincidence on leads T1 and U1. The gate 236 is enabled by the signal on lead 253 so that a pulse is transmitted over the supervisory highway E1. No enabling signal as yet appears on lead 252 so that gate 234 is not enabled, and no pulse is supplied to the busy guarding highway C1 in this initial frame. In the low speed circuits, in the logic cycle of this link, the linefinder time slot coincides with pulse interval P2. Therefore in the line and trunk supervisory circuits 603, the flip-flop E$a$ is set. But the flip-flop C remains reset. The call sequence switch is initially in state H$n$. In response to these seizure conditions the call sequence circuits set the flip-flop H$a$, causing the call sequence switch to advance to state H1. The calling party receives dial tone. The flip-flop S is reset to stop scanning.

E$a$=E1 P2 K$a'$
H$a$=E$a$ P2 S C' H$n$
D$t$=H1 P2 L
S'=H$n'$ P6

The calling party then proceeds to dial. The line loop is opened by the dialing impulses, and during such frames the register E$a$ remains in the reset condition. At the beginning of the first impulse of a digit the register B is set causing the timer to run.

B=H$n'$ E$a'$ P5 L (X$t'$+X$t$X5)

The advance control unit 816 produces a signal which advances the tens digit once. The register R is then set to prevent further advance during the same impulse.

T$a$=B R' E$a'$ H1 P3 L C$p$ 1$a$
R=B E$a'$ P4 L

Upon loop closure at the end of an impulse, the flip-flop F$b$ is set to cause the timer to be reset to normal, and the register R is reset. However the register B remains set, so that the timer continues to run.

F$b$=B E$a$ R (X$t'$+X$t$X5)
R'=E$a$ P3 F$n$ for each dial impulse the sequence of equations for T$a$, R, F$b$, R' are repeated, advancing the tens digit in the line number register once and only once for each impulse.

At the end of the first digit, the loop remains closed for more than 100 milliseconds, so that the timer reaches state F100. Then the flip-flop H$a$ is set to advance the sequence switch to state H2. The flip-flop F$b$ is set to cause the timer to reset to normal, and the register B is reset, so that the timer stops and remains in the normal condition. Dial tone is stopped.

H$a$=E$a$ B R' F100 P2 H1
F$b$=H$a$ B H1 P3 T9'
B'=H$a$ P4 T9'
D$t'$=H2 P2

Note that if the tens digit is 9 (T9), that the timer is not reset and that it continues to run. This indicates an outgoing trunk call, and the equations from this point on are given in section J5.

Assuming a tens digit 1 through 8 inclusive, a units digit may then be dialed. Upon receipt of the first impulse the timer is started.

$$B=Hn'\ Ea'\ P5\ L\ (Xt'+XtX5)$$

In the next frame the advance control unit 816 produces a signal for advancing the units digit in the tens register, and the register R is set.

$$Ua=B\ R'\ Ea'\ H2\ P3\ L$$
$$R=B\ Ea'\ P4\ L$$

At the end of the impulse the timer is reset, and the register R is reset.

$$Fb=B\ Ea\ R\ (Xt'+XtX5)$$
$$R'=Ea\ P3\ Fn$$

For each impulse the sequence of equations for Ua, R, Fb, and R' is repeated. At the end of the digit the line loop remains closed so that the timer advances to state F100, the sequence advance flip-flop Ha is set to cause the sequence switch to advance to state H3. Then the register B is reset to stop the timer, which remains in state F100.

$$Ha=Ea\ B\ R'\ F100\ P2\ H2$$
$$B'=Ha\ P4\ T9'$$

*J2a Called Line Busy*

If the called line is busy, the sequence switch remains in state H3, and in the next P20 frame the timer advance logic 402 produces a special timer advance signal Fa120. This causes the timer to advance to state F120, and busy tone is supplied to the calling line.

$$Fa120=H3\ P20\ P2\ F100$$
$$Bt=H3\ F120\ P2$$

*J2b. Called Line Idle*

If the called line is idle, there will be no signal occurring on the supervisory highway C1 in the time slot P3 of the logic cycle of the link. Then the flip-flop Ha is set to cause the sequence switch to advance to state H4. Ringing tone is supplied to the calling line, and a ringing signal is transmitted to the called line.

$$Ha=C'\ P3\ H3\ F100\ P3\ L\ T9'$$
$$Rt=H4\ P2$$
$$Rg=H4\ P3\ L$$

Answering of the call by called party is indicated by a pulse appearing on the highway E1 in time slot P3 of the logic cycle of the link, setting the called party supervisory flip-flop Eb. The flip-flop Ha is set to advance the sequence switch to H5. The ringback tone and ringing signals are stopped. The switch through the register is set for both the calling and the called lines in time slots P2 and P3 respectively. The timer remains in its state F100.

$$Eb=E1\ P3\ L$$
$$Ha=Eb\ H4\ P3$$
$$Rt'=H5\ P2$$
$$Rg'=H5\ P3\ L$$
$$St=H5\ P2+H5\ P3\ L$$

The effective multiplex connection has now been established from the calling line to the finder gate, through the link to the connector gate, thence to the called line for two-way conversation.

J3. *Trunk—Incoming Call Operation*

Assume that the trunk circuit TK1 is seized by an incoming call. The signal receiver 340 places a signal on lead 341, which with the pulse on lead DP29, enables gate 336 and in the time slot of the trunk produces a pulse on the trunk supervisory highway E2. In the logic cycle of this trunk, during the pulse P2 the flip-flop Ec is set. The flip-flop Ha is set to advance the sequence switch to state H1. The incoming call indicator register is also set. Then the dial tone register is set. The line number register cores are cleared.

$$Ec=E2\ P2$$
$$Ha=Ea'\ P3\ Ec\ Hn$$
$$Ka=Ea'\ P3\ Ec\ Hn$$
$$Dt=H1\ P2\ Ka$$
$$Tb=Ub=H1\ B'\ P2\ Ka$$

The dial impulses interrupt the signal on lead 341 so that the pulses on highway E2 are interrupted, and during the impulse the flip-flop Ec remains reset. The dialed digits are registered in a manner similar to that in a link as described in section J2, except that the dialing supervisory logic 504, and the advance control logic 816 follow the condition of the flip-flop Ec with the incoming indicator register Ka set. At the beginning of the first impulse the register B is set to start the timer.

$$B=Hn'\ Ec'\ P5\ Ka$$

At the beginning of each impulse the tens register is advanced once and the register R is set, and at the end of each impulse the timer is reset to normal and the register R is reset. The timer continues to run throughout the digit.

$$Ta=B\ R'\ Ec'\ H1\ P2\ Ka\ Cp\ 1a$$
$$R=B\ Ec'\ P4\ Ka$$
$$Fb=B\ Ec\ R$$
$$R'=Ec\ P3\ Fn$$

At the end of the digit the timer advances to state F100, causing the flip-flop Ha to be set to advance the sequence switch to state H2. The flip-flop Fb is set to reset the timer to normal, and the register B is reset, stopping the timer. The dial tone register is reset.

$$Ha=B\ R'\ F100\ P2\ H1\ Ka$$
$$Fb=Ha\ B\ H1\ P3\ T9'$$
$$B'=Ha\ P4\ T9'$$
$$Dt'=H2\ P2$$

At the beginning of the units digit the register B is again set to start the timer.

$$B=Hn'\ Ec'\ P5\ Ka$$

Each impulse is registered in the same manner as were the impulses of the tens digit.

$$Ua=B\ R'\ Ec'\ H2\ P2\ Ka\ Cp\ 1a$$
$$R=B\ Ec'\ P4\ Ka$$
$$Fb=B\ Ec\ R$$
$$R'=Ec\ P3\ Fn$$

At the end of the units digit the timer advances to F100. The sequence advance flip-flop Ha is set to advance the sequence switch to the busy test state H3. The register B is reset to stop the timer.

$$Ha=B\ R'\ F100\ P2\ H2\ Ka$$
$$B'=H2\ P4\ T9'$$

If the called line is busy the timer is advanced to state F120 and the busy tone register set, the equations being the same as for a local call in section J2a.

If the called line is idle, the flip-flop Ha is set to advance the sequence switch to the ringing state H4. The ringing and ringback tone registers are set.

$$Ha=C'\ H3\ F100\ P2\ T$$
$$Rg=P2\ H4\ T$$
$$Rt=P2\ H4$$

In the trunk circuit, the loop to the central office is closed.

$$Et=DP29\ P2\ (Rt+Ea+Eb)$$

In response to answering by the called party, a pulse appears on the line supervisory highway E1 in coincidence with pulse P2 to set the flip-flop Eb. The flip-flop Ha is set to advance the sequence switch to the conversation state H5. In the signal state register, the ringing and ringback tone registers are reset, and the switch through register is set.

$$Eb=E1\ P2\ Ka$$
$$Ha=Eb\ H4\ P3$$
$$Rg'=P2\ H5\ T$$
$$Rt'=P2\ H5$$
$$St=P2\ H5$$

The time division multiplex connection between the trunk circuit and the called line is now completed, and the conversation may proceed.

J4. *Trunk Transfer—Incoming Call*

*Trunk.*—The trunk is assumed to be at the normal conversation stage, with the sequence switch in state H5. If it is desired to transfer the trunk to another local line, the digit "2" is dialed by the local party. The flip-flop E*b* detects these dial impulses. This digit is registered by the sequence switch. Upon receipt of the first dial impulse, the sequence switch is advanced to state H6.

$$Ha=Eb'\ H5\ P2\ T\ B'$$

The timer is started and the control register R is set.

$$B=H6\ P6$$
$$R=Eb'\ B\ P7\ H6$$

At the end of the impulse, the timer is reset to F100, and the control register R is reset.

$$Fb100=EbR\ H6\ P8\ B$$
$$R'=Eb\ P3\ F100$$

The second impulse is similarly registered and the sequence switch advanced to state H7.

$$Ha=B\ R'\ P2\ Eb'\ H6$$
$$B'=Ha\ P4\ T9'$$
$$B=H7\ P6$$
$$R=Eb'\ P7\ H7\ B$$
$$Fb100=B\ Eb\ 3\ H7\ P8$$
$$R'=Eb\ P3\ F100$$

The timer continues to run until at F200 the transfer circuit is seized.

$$Xt=R'\ F200\ P2\ H7\ X0$$

The timer is reset to F100 and turned off.

$$Fb100=Xt\ P5\ X0$$
$$B'=Xt\ P5\ X0$$

The trunk transfer sequence circuit is advanced.

$$X1=Xt\ P6\ X0\ T$$

The line number is written into the transfer cores, using the transfer row driver 810 and generator 812. Then the transfer sequence circuit is advanced.

$$Xw=Xt\ P2\ X1\ Cp\ 1a$$
$$X2=Xt\ P3\ X1$$

*Link.*—The transfer sequence circuit is static, which means that its output continues through all of the logic cycles. In the logic cycle of a scanning idle link, the signal X2 causes seizure. The seized link is marked as engaged in a transfer.

$$Ha=S\ P2\ Hn\ X2\ Ea'$$
$$Xt=S\ P3\ Hn\ X2\ Ea'$$

The transfer sequence circuit is advanced, and the link's line number register cores are cleared. The transfer sequence circuit is then advanced again.

$$X3=Xt\ P5\ X2\ L$$
$$\underline{Tb}=\underline{Ub}=H1\ P2\ Xt\ X3$$
$$X4=H1\ P4\ Xt\ X3$$

*Trunk.*—The dial tone register of the trunk is set only as a mark, which in coincidence with the switch through register output produces an inhibit signal (I). This signal (I) is used to inhibit operation of the transmission gates by blocking output of the line number register to the line circuit, and the switch through signal to the trunk gate.

$$Dt=X4\ Xt\ T\ P2$$
$$I=St\ Dt$$

*Link.*—The line number is read into the link's calling line number register. The transfer sequence circuit is advanced.

$$Xr=X4\ H1\ Xt\ P14\ Cp\ .5$$
$$X5=X4\ H1\ Xt\ P3$$

The link operation now proceeds as for a local call, as given by the connector equations in section J2, with X5 true. The local line acts as a calling line to dial the number of the desired new local line. If the called line is idle and the call is answered, conversation proceeds to determine if the called party wishes to accept the call. Either party may then disconnect, and in response thereto the other line is transferred to the trunk (which is marked by its register X*t*).

14*a*. *Calling Party Disconnect—Called Party Transferred to Trunk*

*Link.*—Upon disconnect by the calling party the called line number is written into the transfer row. The transfer sequence circuit advances.

$$Ew=Ea'\ Eb\ P3\ H5\ Xt\ L\ Cp\ 1a$$
$$B=Hn'\ Ea'\ P5\ L\ (Xt'+Xt\ X5)$$
$$X6=Ea'\ Eb\ P7\ H5\ Xt$$

*Trunk.*—In the trunk, the line number register cores are cleared.

$$\underline{Tb}=\underline{Ub}=P2\ Xt\ X6$$

*Link.*—The link control registers are restored to normal, and the transfer sequence circuit is advanced.

$$Fb=P4\ Xt\ L\ X6$$
$$R=P4\ B\ Ea'\ L$$
$$Hb—P5\ Xt\ L\ X6$$
$$X7=P6\ Xt\ L\ X6$$
$$Xt'=P7\ Hn$$
$$B'=Hn\ Fn\ P8$$
$$R'=Hn\ P5$$
$$\underline{Tb}=Hn\ L\ P3$$
$$\underline{Ub}=Hn\ L\ (S'\ P2+P3)$$

*Trunk.*—The transfer row is read into the trunk.

$$Xr=X7\ Xt\ P14\ Cp\ .5$$

The trunk is restored to the normal conversation state, by resetting the dial tone register to remove the inhibit signal (I), and setting the flip-flop H*b*5 to restore the sequence switch to state H5.

$$Dt'=X7\ Xt\ P2$$
$$Hb5=X7\ Xt\ P3$$

The transfer sequence circuit 602 is restored to normal, and the transfer mark is reset.

$$XO=X7\ Xt\ P4$$
$$Xt'=H5\ T\ P5$$

J4*b*. *Called Party Disconnect—Calling Party Transferred to Trunk*

Upon disconnect by the called party, the transfer circuit causes the original trunk circuit connection to be restored to normal.

*Link.*—The transfer sequence circuit is advanced to X8

$$X8=Ea\ Eb'\ P6\ H5\ Xt\ X5$$

*Trunk.*—The trunk is restored to normal conversation.

$$Dt'=P2\ X8\ Xt$$
$$Hb5=P6\ X8\ Xt\ T$$

*Link.*—The link is restored to idle, first clearing the cores of the transfer row and the link rows.

$$Xr=X8\ Xt\ P14\ Cp\ .5$$
$$\overline{Ub}=\overline{Tb}=(P2+P3)\ X8\ Xt\ L$$
$$\overline{Fb}=\overline{P4}\ Xt\ L\ X8$$
$$Hb=P5\ Xt\ L\ X8$$
$$Xt'=Hn\ P7$$

*Trunk.*—The transfer sequence circuit is reset to normal, and the transfer mark is reset.

$$X0=H5\ X8\ T\ P4\ Xt$$
$$Xt'=H5\ T\ P8$$

J4c. *Called Line Busy or No Answer*

If the conversation stage is not reached because the called line is busy or does not answer, the digit "1" may be dialed to return to the trunk. The timer is started by the dial impulse.

$$B=Hn'\ Ea'\ P5\ L\ (Xt'+Xt\ X5)$$

The transfer sequence circuit is advanced to X9.

$$X9=B\ R'\ P3\ Xt\ L\ Ea'\ (H3+H4)$$
$$R=B\ Ea'\ P4\ L$$

The timer is reset to F100 at the end of the impulse.

$$Fb100=Ea\ Xt\ X9\ P2$$
$$R'=Ea\ F100\ P3$$

The transfer sequence circuit is set back to X8.

$$X8=Ea\ B\ R'\ Xt\ P6\ F200\ X9$$

*Trunk.*—The trunk is restored to normal conversation.

$$Dt'=P2\ X8\ Xt$$
$$Hb5=P6\ X8\ Xt\ T$$

*Link.*—The link is restored to idle.

$$\overline{Ub}=\overline{Tb}=(P2+P3)\ X8\ Xt\ L$$
$$\overline{Fb}=\overline{P4}\ Xt\ L\ X8$$
$$Hb=P5\ Xt\ L\ X8$$
$$Xt'=Hn\ P7$$
$$B'=Hn\ Fn\ P8$$
$$R'=Hn\ P5$$

J5. *Outgoing Call*

*Link.*—An outgoing call is initiated, and the operation proceeds in a link as for a normal local call, as described in section J2, until the digit "9" is dialed. The sequence switch advances to H2.

$$Ha=Ea\ B\ R'\ F100\ P2\ H1$$

Because of the condition (T9') in the equations for Fb and B', the timer is not reset and continues to run. If a trunk is idle, the transfer circuit is seized, and the transfer sequence is set to X11.

$$Xt=T9\ P3\ L\ Atb'\ X0\ F100$$
$$X11=T9\ X0\ Xt\ P5$$

In the next frame, since the timer is still, running (B true), the sequence switch is advanced to H3.

$$Ha=Ea\ B\ R'\ F100\ P2\ H2$$

The line number is written into the transfer cores and the transfer sequence circuit is advanced.

$$Xw=Xt\ P2\ X11\ Cp\ 1a$$
$$X12=Xt\ P3\ X11$$

*Trunk.*—The transfer sequence circuit is static, which means that its output continues through all of the logic cycles. In the logic cycle of the first idle trunk, the signal X12 causes seizure by reading the number from the transfer cores into line number register, and advancing the sequence switch to H1. The all trunks busy register is set, and the transfer sequence circuit is advanced.

$$Xr=THn\ X12\ P14\ Cp\ .5$$
$$Ha=T\ Hn\ X12\ P3$$

$$Atb=Ha\ Hn\ P4\ T$$
$$X13=T\ Ha\ X12\ P6$$

The all trunks busy register is reset by the first idle trunk.

$$Atb'=Hn\ C'\ P2\ T$$

*Link.*—The link is restored to idle.

$$Fb=P4\ Xt\ L\ X13$$
$$Hb=P5\ Xt\ L\ X13$$
$$B'=Hn\ Fn\ P8$$
$$X0=P6\ Xt\ L\ X13$$
$$Xt'=P7\ Hn$$
$$\overline{Tb}=Hn\ L\ P3$$
$$\overline{Ub}=Hn\ L\ (S'\ P2+P3)$$

If the timer had advanced to F120 with no trunk found idle, the sequence circuit would still have advanced to H2 and then H3 as indicated. The busy tone register is set and the timer is stopped.

$$Bt=H3\ F120\ P2$$
$$B'=T9\ F120\ P5$$

The signaling unit provides a distinctive busy tone. Upon disconnect by the calling party, the timer is restarted and advances to F 280 to release the connection.

$$B=Hn'\ Ea'\ P5\ L\ (Xt'+XtX5)$$

*Trunk.*—If an idle trunk, say trunk TK1, has been seized for the outgoing call, it remains in sequence state H1 for the duration of the call. The calling line supervisory register is set, the loop to the central office is closed, and the switch through register is set.

$$Ea=E1\ P2\ Ka'$$
$$Et=Ea\ Dp29\ P2$$
$$St=H1\ P2\ Ka'\ T$$

The trunk returns supervisory pulses over highway E2 to set the trunk supervisory register.

$$Ec=E2\ P2$$

The dial signals from the calling line are repeated to the trunk loop.

$$Et'=H1\ Ka'\ Ea'\ Dp29\ P2$$
$$Et=Ea\ Dp29\ P2$$

The timer starts at each impulse, and stops and resets at the end of each impulse.

$$B=H1\ Ka'\ Ea'\ T\ P2$$
$$B'=H1\ Ka'\ Ea\ TP2$$
$$Fb=H1\ Ka'\ Ea\ T\ P2$$

The call proceeds through the central office in a usual manner. Upon disconnect by the calling party the timer starts and advances to F280 to release the connection as on a local call.

$$B=H1\ Ka'\ Ea'\ T\ P2$$

J6. *Disconnect*

Various arrangements are possible for releasing a connection upon disconnect. For example a connection could be released in response to disconnect by both parties. However in a specific embodiment disclosed in this application, calling party release is employed for both local calls and trunk calls. The timer is employed to distinguish spurious impulses from disconnect by the calling party. On local calls and outgoing trunk calls the calling party loop condition is supervised by the flip-flop Ea, and on incoming trunk calls the trunk condition is supervised by the flip-flop Ec. In response to each calling party on-hook (loop opened) signal, the timer is started by setting the register B.

$$B=Hn'\ Ea'\ P5\ L\ (Xt'+Xt\ X5)$$
$$+Hn'\ Ec'\ P5\ Ka$$

Each time the calling loop is opened the register R is set. If this is merely a short impulse and the loop is closed before the timer reaches state F280, the timer is reset to normal and continues running. Also the register R is reset.

$$R = B\ P4\ (Ea'\ L + Ec'\ Ka)$$
$$Fb = B\ Ea\ R\ (Xt' + Xt\ X5) + B\ Ec\ R$$
$$R' = P3\ Fn\ (Ea + Ec)$$

If after the impulse the loop now remains closed the timer advances from Fn to F120 and stops.

$$B' = Ea\ F120$$

If the calling loop remains open for an interval long enough for the timer to reach state F280, the connection is released. In response to the signal F280, the sequence switch, the timer, and the registers B and R are reset.

$$Hb = F280$$
$$Fb = F280$$
$$B' = F280$$
$$R' = F280$$

In response to the normal state signals Hn and Fn, all of the registers associated with the signal state unit 901 are reset as may be seen in the equations in section H13. Also if this is a local call, the line number cores of the high speed memory are cleared, except for the tens digit in the calling line row.

$$\overline{Tb} = L\ Hn\ P3$$
$$\overline{Ub} = L\ Hn\ (S'\ P2 + P3)$$

While we have described above the principles of our invention in connection with specific apparatus, it is to be clearly understood that this description is made only by way of example and not as a limitation to the scope of our invention. For example in the Electronic Telephone System disclosed in the U.S. Patent 2,854,516, in which the ferrite core memory has separate columns for the calling line information and called line information, and there is only one row per link corresponding to a single time slot per link, a row of transfer cores may be incorporated in the memory and controlled substantially the same as disclosed in the specific embodiment of this application. Also there are known arrangements in which switching control apparatus includes a memory having a three dimensional array, or arranged in some other manner. Therefore as used in the claims the word column means a set of ferrite cores threaded by a single sense winding or a similar arrangement with other memory elements, and a row means a set of elements driven by the read and write pulses in any one time slot.

What is claimed is:

1. A communication switching system comprising
a plurality of terminating units,
switching means for establishing connections between said terminating units,
a source of recurring pulses,
and common control equipment shared on a time division multiplex basis by a plurality of said connections under the control of said source;
said equipment including a recirculating memory having a coordinate array of elements for storing information,
said source including an arrangement for supplying to rows of elements of the memory pulses in time slots each occurring once per recurring cycle with each row individually associated with one time slot,
and logic circuits for modifying the information stored in said elements, responsive to signals received from one of said terminating units, for selectively establishing a connection by way of said switching means between two of said terminating units,
and also including means responsive to signals received from one of said terminating units during said connection for establishing a new connection between one of said two terminating units and a third terminating unit using a transfer group of storage elements individually associated with columns of said memory, and an arrangement for transferring information from one memory row during its time slot to the transfer group, and from the transfer group to another row during its time slot.

2. A communication switching system according to claim 1, wherein said two terminating units comprise a calling unit and a called unit, the initial connection being established in response to signals from the calling unit, and wherein said new connection is established in response to signals from the called unit.

3. A communication switching system according to claim 1, wherein
said equipment includes bistable devices individually associated with columns of elements of the memory,
so arranged that during each time slot the information in the corresponding row is first read into the respective bistable devices associated with the columns, and is then written back into the elements of the row either in the same form or as selectively modified by said logic circuits.

4. A communication switching system according to claim 3, wherein said transfer group comprises an additional row of elements in said memory.

5. A communication switching system according to claim 3, wherein some of said terminating units are local line circuits and others are trunk circuits, each line circuit having an individual line number,
and wherein said switching means includes a plurality of finder connector links, and a time division multiplex arrangement for effectively connecting any one of the line circuits with the finder side or connector side of any link or with any trunk circuit.

6. A communication switching system according to claim 5, wherein each said link has a finder multiplex transmission gate and a separate connector multiplex transmission gate connected by a link coupling circuit, each line circuit and each trunk circuit having an individual multiplex transmission gate,
each finder, each connector, and each trunk circuit transmission gate being individually associated with a row in said memory,
said information stored in the memory including line number information, said equipment being so arranged that each finder row may store a calling line number, each connector row may store a called line number, and each trunk row may store either a calling or a called line number,
means for effectively connecting the transmission gate individually associated with a row and the transmission gate corresponding to the line number stored in that row by supplying coincident enabling pulses to these gates during the corresponding time slot.

7. A communication switching system according to claim 6, wherein the first connection is between a trunk circuit and a line circuit, the line number of the line circuit being stored in the row of the trunk circuit,
the said means for establishing a new connection comprising an arrangement responsive to a transfer signal from the line circuit for marking the trunk as engaged in a transfer and holding it, and for causing the line number to be transferred during the trunk time slot from the trunk row to the transfer group, and then during the finder time slot of an idle link to be transferred from the transfer group to the finder row of that link,
means for receiving line number signals from the line circuit and storing the received number in the connector row of the link, to establish a connection by way of the link between the two line circuits.

8. A communication switching system according to claim 7, further including call sequence means, and an arrangement for registering said transfer signal in the call sequence means.

9. A communication switching system according to claim 7, wherein said equipment includes means responsive to a disconnect signal from either line circuit for causing the other line circuit to be effectively connected to the marked trunk, the transfer marking to be restored to normal, and the link to be released.

10. A communication switching system according to claim 9, wherein if said disconnect signal is from the finder-connected line circuit, the memory row of the marked trunk is cleared, and the line number in the connector row of the link is transferred to the transfer group and then to the trunk row in the respective time slots.

11. A communication switching system according to claim 9, wherein said transfer group comprises an additional row of elements in said memory.

12. A communication switching system according to claim 9, including means responsive to a service request signal from a line circuit for seizing an idle link circuit, the calling line number being stored in the finder row of the seized link, and line number signals from the calling line being stored in the connector row, means responsive to a given number being received into the connector row for causing the calling line number to be transferred from the finder row to the transfer group, and for seizing an idle trunk and transferring the number from the transfer group to the trunk row, in the corresponding finder and trunk time slots respectively, and for then releasing the link, whereby the calling line circuit is connected to the trunk circuit for an outgoing call.

13. A communication switching system according to claim 12, wherein one of said link circuits is an auxiliary link, allotting means which permit the seizure of the auxiliary link only if all other links are busy, means for preventing the completion of a connection from the connector of the auxiliary link to any line circuit, so that the auxiliary link can be used only for initiating an outgoing call.

14. A communication switching system according to claim 13, wherein said memory elements are ferrite cores, and said transfer group is an additional row of ferrite cores in said memory.

15. In a communication switching system, a plurality of line circuits having individual subscriber lines connected thereto, a plurality of regular line finders, one auxiliary line finder, means for causing an idle line finder to scan the line circuits for a line initiating a call, a bistable trigger device which indicates whether or not each line finder is in scanning condition, and means for time sharing said trigger device by all of said line finders, wherein said time-sharing means comprises a memory having a plurality of bistable storage elements associated with said trigger device, each line finder having one of the storage elements individually associated with it, the trigger device and each storage element having a first state for indicating a scanning line finder and a second state for not scanning, means for supplying cyclically recurring pulses to said memory, with each line finder being assigned an individual time position in each pulse frame, and means responsive to said pulses for circulating the scanning-state indications of the line finders between the memory and the trigger device so that for each line finder its state will be indicated by the trigger device during its time position and stored in its memory element during the remainder of each frame, allotter bistable trigger device means common to all of said line finders and associated with said scanning-indicating trigger device for conditioning the auxiliary line finder for scanning only if all regular line finders are busy, a plurality of trunk circuits, means in each line finder effective after it has found and become connected to a line initiating a call, and responsive to a given signal from that line, for causing a connection to be established between the line and one of said trunk circuits for initiating an outgoing call, and means for preventing the use of said auxiliary line finder for establishing any connections except said connection from a calling line to a trunk circuit for making an outgoing call.

16. In a communication switching system, the combination as claimed in claim 15, wherein each pulse frame includes an allotter time position during which there occurs a first pulse and a later second pulse, said allotter trigger device means comprises two trigger devices, the first of which is set to a first state in the allotter time position of every frame in response to the second pulse and is set to a second state during the frame by the scanning-indicating trigger of any regular line finder which is conditioned for scanning, and the second of which is set to a first state in the allotter time position in response to the first pulse if the first allotter trigger device remains in the first state because no regular line finder is scanning, and is set to a second state by the scanning-indicating trigger of an idle regular line finder which becomes conditioned for scanning.

17. In a communication switching system, the combination as claimed in claim 16, further including means including said allotter trigger devices for conditioning only one idle one of said regular line finders for scanning at a time.

References Cited in the file of this patent

UNITED STATES PATENTS

| | | |
|---|---|---|
| 2,501,546 | Stehlik | Mar. 21, 1950 |
| 2,917,583 | Burton et al. | Dec. 15, 1959 |
| 3,015,699 | Faulkner et al. | Jan. 2, 1962 |
| 3,049,593 | Touraton et al. | Aug. 14, 1962 |